US010616095B2

(12) United States Patent
Salkintzis

(10) Patent No.: US 10,616,095 B2
(45) Date of Patent: Apr. 7, 2020

(54) DATA FLOWS OVER MULTIPLE ACCESS NETWORKS

(71) Applicant: Motorola Mobility LLC, Chicago, IL (US)

(72) Inventor: Apostolis Salkintzis, Athens (GR)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

Patent file contains an affidavit/declaration under 37 CFR 1.130(b).

(21) Appl. No.: 15/592,034

(22) Filed: May 10, 2017

(65) Prior Publication Data

US 2018/0331944 A1    Nov. 15, 2018

(51) Int. Cl.
| | |
|---|---|
| H04L 12/707 | (2013.01) |
| H04W 76/15 | (2018.01) |
| H04L 12/741 | (2013.01) |
| H04L 12/721 | (2013.01) |
| H04W 84/12 | (2009.01) |
| H04W 88/06 | (2009.01) |

(52) U.S. Cl.
CPC .............. *H04L 45/24* (2013.01); *H04L 45/38* (2013.01); *H04L 45/74* (2013.01); *H04W 76/15* (2018.02); *H04W 84/12* (2013.01); *H04W 88/06* (2013.01)

(58) Field of Classification Search
CPC ...... H04W 28/08; H04W 88/06; H04W 88/10
See application file for complete search history.

(56) References Cited

U.S. PATENT DOCUMENTS

| 2015/0085781 | A1* | 3/2015 | Itoh | H04W 8/26 370/329 |
|---|---|---|---|---|
| 2017/0374579 | A1* | 12/2017 | Wang | H04W 28/08 |
| 2018/0262924 | A1* | 9/2018 | Dao | H04W 24/02 |

OTHER PUBLICATIONS

3rd Generation Partnership Project, "Technical Specification Group Services and System Aspects; Study on Architecture for Next Generation System", 3GPP TR 23.799 V14.0.0, Dec. 2016, pp. 430-437, available at https://portal.3gpp.org/desktopmodules/Specifications/SpecificationDetails.aspx?specificationId=3008.*
3GPP, "3rd Generation Partnership Project; Technical Specification Group Services and System Aspects; Study on Architecture for Next Generation System (Release 14)", 3GPP TR 23.799 V0.6.0 (Jul. 2016), Jul. 2016, pp. 1-321.

(Continued)

*Primary Examiner* — Asad M Nawaz
*Assistant Examiner* — Zhaohui Yang
(74) *Attorney, Agent, or Firm* — Kunzler Bean & Adamson

(57) ABSTRACT

Apparatuses, methods, and systems are disclosed for utilizing multiple access network for data flows. One apparatus includes a network interface that communicates with a remote unit and a processor. The apparatus establishes a control connection with the remote unit and receives a plurality of network addresses used by the remote unit to communicate over different access networks. The apparatus receives a first set of data flows transmitted by the remote unit over a first access network. The processor determines that a subset of the first set of data flows is to utilize both the first access network and the second access network and sends a command to the remote unit over the control connection to utilize the second access network for at least some of the traffic of each data flow in the subset of the first set of data flows.

20 Claims, 11 Drawing Sheets

(56) References Cited

OTHER PUBLICATIONS

Motorola Mobility et al., "Solution for ATSSS", SA WG2 Meeting #116 S2-163404, Jul. 11-15, 2016, pp. 1-8.
Motorola Mobility et al., "Solution for ATSSS", SA WG2 Meeting #116 S2-164029, Jul. 11-15, 2016, pp. 1-9.
Motorola Mobility et al., "Solution for ATSSS", SA WG2 Meeting #116 S2-164193, Jul. 11-15, 2016, pp. 1-9.

* cited by examiner

DATA FLOWS OVER MULTIPLE ACCESS NETWORKS

FIELD

The subject matter disclosed herein relates generally to wireless communications and more particularly relates to utilizing multiple access network for data flows.

BACKGROUND

The following abbreviations and acronyms are herewith defined, at least some of which are referred to within the following description. Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Clear Channel Assessment ("CCA"), Control Channel Element ("CCE"), Channel State Information ("CSI"), Common Search Space ("CSS"), Discrete Fourier Transform Spread ("DFT-S"), Downlink Control Information ("DCI"), Discrete Fourier Transform Spread OFDM ("DFT-S-OFDM"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ET SI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Negative-Acknowledgment ("NACK") or ("NAK"), Network Function ("NF"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Switching/Splitting Function ("SSF"), Scheduling Request ("SR"), Session Management Function ("SMF"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, the core network is to support access traffic steering, switching and splitting ("ATSSS") between 3GPP access networks (including LTE, evolved LTE, and New Radio) and non-3GPP (typically WLAN) access networks.

BRIEF SUMMARY

Methods for utilizing multiple access network for data flows are disclosed. Apparatuses and systems also perform the functions of the methods. In one embodiment, a method of a traffic control function for utilizing multiple access network for data flows includes establishing a control connection with a remote unit and receiving, over the control connection, a plurality of network addresses belonging to the remote unit. Here, each of the plurality of network addresses used to communicate over a different access network. The method includes receiving a first set of data flows transmitted by the remote unit over a first access network and relaying each data flow in the first set of data flows to a remote host. Here, the first set of data flows is not received over the control connection. The method includes determining that a subset of the first set of data flows is to utilize both the first access network and a second access network and sending a command to the remote unit over the control connection to utilize the second access network for at least some of the traffic of each data flow in the subset of the first set of data flows.

In another embodiment, a method of a UE for utilizing multiple access network for data flows includes establishing a control connection with a network function within a mobile communication network and transmitting, over the control connection, a first network address of a remote unit associated with the first access network and a second network address of the remote unit associated with a second access network. Here, the UE communicates with the mobile communication network over the first and second access networks. The method includes the UE transmitting a first set of data flows over the first access network. Here, the first set of data flows is not transmitted over the control connection. The method further includes the UE receiving a command from the network function to utilize the second access network for at least some of the traffic of each data flow in a subset of the first set of data flows. The method includes the UE transmitting the at least some traffic of the subset over the second access network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
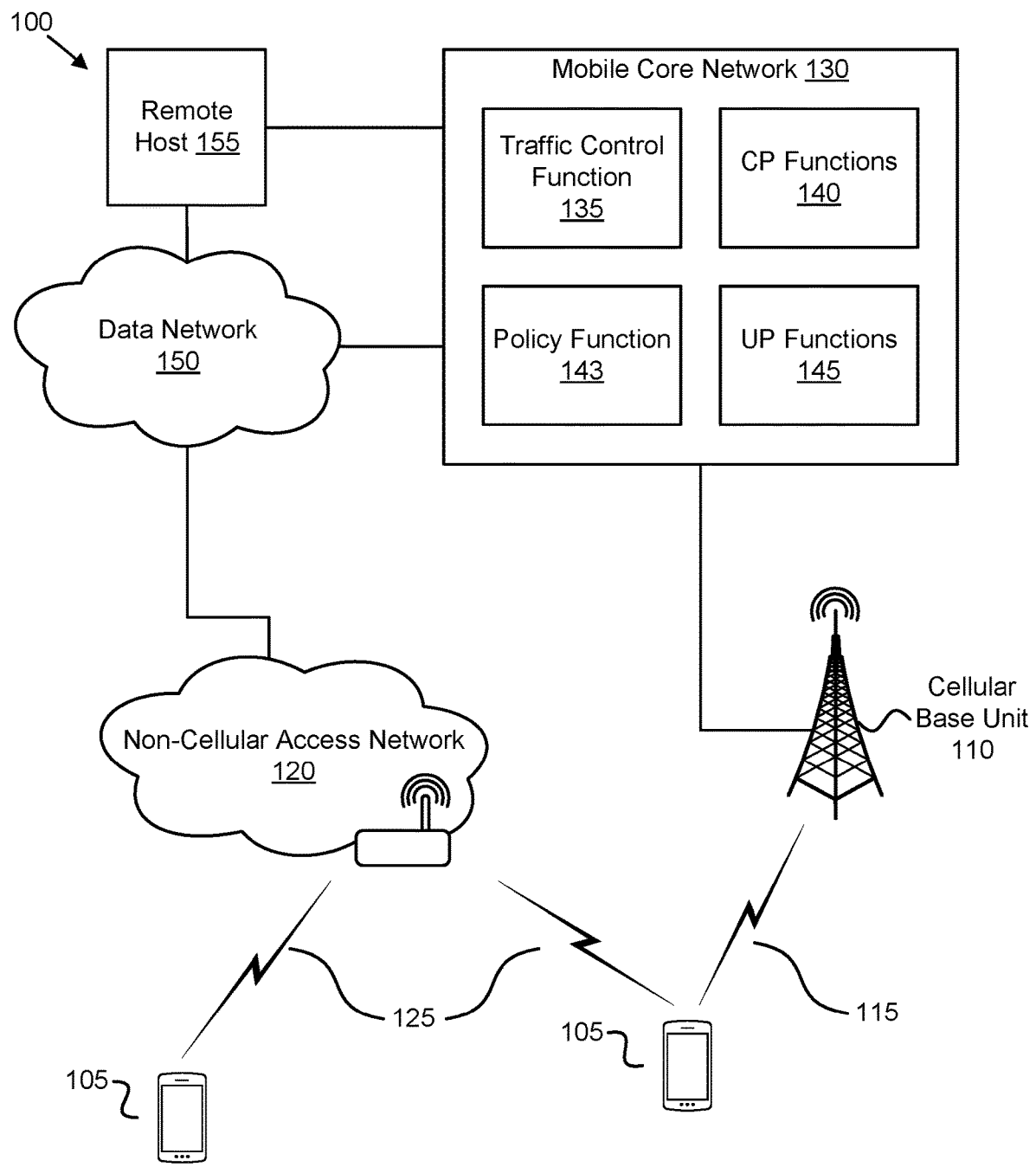
FIG. 1 is a schematic block diagram illustrating one embodiment of a wireless communication system for access traffic steering, switching, and splitting.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to support access traffic steering, switching and splitting ("ATSSS") between 3GPP and non-3GPP access networks, a UE establishes a control connection with a traffic control function. The control connection may be established either over the 3GPP access network or over the non-3GPP access network. Via this connection, the UE may receive steering rules which are applied for access selection (selecting between 3GPP and WLAN) when initiating a new data flow. Also, the UE may receive switching and/or splitting commands from the traffic control function when the network decides to switch or split one or more of the UE's data flows. Here, the UE is capable of steering the access traffic (e.g., performing access selection for a new data flow), while the traffic control function initiates both access traffic switching and access traffic steering of ongoing data flow, as discussed in greater detail below.

As used herein, "steering" access traffic refers to the selecting the "best" access network for a new data flow. The selection of the "best" access network is typically based on criteria such as the network load, the measured radio signal quality, the application associated with the data flow, etc. Also as used here, access traffic "switching" refers to moving all traffic of an ongoing data flow from one access network to another access network in a way that maintains the continuity of the data flow. Further, access traffic "splitting," as used herein, refers to a procedure that splits the traffic of a data flow across multiple access networks. When traffic splitting is applied to a data flow, some traffic of the data flow is transferred via one access and some other traffic of the same data flow is transferred via another access. Accordingly, the present disclosure distinguished between "steering," "switching," and "splitting" access traffic.

The term "data flow" typically refers to a sequence of data packets that have the same source and destination endpoints (e.g. all packets transmitted by an application via a socket programming interface). A data flow can be an IP data flow when the data packets are IP packets or a non-IP data flow when the data packets are anything but IP packets (e.g. Ethernet frames, PPP frames, PDCP packet data units, etc.). An IP data flow consists of all IP packets having the same 5-tuple in their IP header: source address, destination address, protocol, source port, destination port. While the disclosure mainly describes steering, switching, and splitting IP data flows, similar principles apply to non-IP data flows such as to Ethernet data flows or to IPSec Encapsulating Security Payload (ESP) data flows.

FIG. 1 depicts a wireless communication system 100 for access traffic steering, switching, and splitting, according to embodiments of the disclosure. In one embodiment, the wireless communication system 100 includes remote units 105, cellular base units 110, cellular communication links 115, non-cellular access networks 120, and non-cellular communication links 125. Even though a specific number of remote units 105, cellular base units 110, cellular communication links 115, non-cellular access networks 120, and non-cellular communication links 125 are depicted in FIG. 1, one of skill in the art will recognize that any number of remote units 105, cellular base units 110, cellular communication links 115, non-cellular access networks 120, and non-cellular communication links 125 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the cellular base units 110 via uplink ("UL") and downlink ("DL") communication signals. Furthermore, the UL and DL communication signals may be carried over the cellular communication links 115. Similarly, the remote units 105 may communicate with one or more non-cellular access networks 120 via UL and DL communication signals carried over the non-cellular communication links 125.

In some embodiments, the remote units 105 communicate with a remote host 155 via a network connection with the mobile core network 130. For example, a remote unit 105 may establish a PDU connection with the mobile core network 130 using either a cellular base unit 110 or a non-cellular access network 120. The mobile core network 130 then relays traffic between the remote unit 105 and the remote host 155 using the PDU connection. In other embodiments, the remote unit 105 may communicate with the remote host over the non-cellular access network 120 without traffic passing through the mobile core network 130. This is referred to as direct offloading.

The cellular base units 110 may be distributed over a geographic region. In certain embodiments, a cellular base unit 110 may also be referred to as an access terminal, a base, a base station, a Node-B, an eNB, a gNB, a Home Node-B, a relay node, a device, or by any other terminology used in the art. The cellular base units 110 are generally part of a radio access network ("RAN") that may include one or more controllers communicably coupled to one or more corresponding cellular base units 110. These and other elements of radio access network are not illustrated but are well known generally by those having ordinary skill in the art. The cellular base units 110 connect to the mobile core network 130 via the RAN.

The cellular base units 110 may serve a number of remote units 105 within a serving area, for example, a cell or a cell sector via a wireless communication link. The cellular base units 110 may communicate directly with one or more of the remote units 105 via communication signals. Generally, the cellular base units 110 transmit downlink ("DL") communication signals to serve the remote units 105 in the time, frequency, and/or spatial domain. Furthermore, the DL communication signals may be carried over the cellular communication links 115. The cellular communication links 115 may be any suitable carrier in licensed or unlicensed radio spectrum. The cellular communication links 115 facilitate communication between one or more of the remote units 105 and/or one or more of the cellular base units 110.

The non-cellular access networks 120 may be distributed over a geographic region. Each non-cellular access network 120 may serve a number of remote units 105 with a serving area. Typically, a serving area of the non-cellular access networks 120 are smaller than the serving area of a cellular base units 110. The non-cellular access networks 120 may communicate directly with one or more remote units 105 by receiving UL communication signals and transmitting DL communication signals to serve the remote units 105 in the time, frequency, and/or spatial domain. Both DL and UL communication signals are carried over the non-cellular communication links 125. The cellular communication links 115 and non-cellular communication links 125 may employ different frequencies and/or different communication protocols. A non-cellular access network 120 may communicate using unlicensed radio spectrum.

As depicted in FIG. 1, a non-cellular access network 120 connects to a mobile core network 130 via a data network 150. In certain embodiments, a non-cellular access network 120 may be controlled by an operator of the mobile core network 130 and may have direct access to the mobile core network 130. In other embodiments, a non-cellular access network 120 is not controlled by the operator of the mobile core network 130 and thus does not have direct access to the mobile core network 130. Here, the non-cellular access networks 120 rely on a data network 150, such as the Internet, to connect to the mobile core network 130. The mobile core network 130 may provide services to a remote unit 105 via the non-cellular access networks 120, as described in greater detail herein.

In one embodiment, the mobile core network 130 is a 5G core ("5GC") or the evolved packet core ("EPC"), which may be coupled to another data network 150, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes a traffic control function 135, at least one control plane ("CP") function 140, a policy function 143, and at least one user plane ("UP") function 145. Although a specific number of traffic control functions 135, CP functions 140, policy functions 143, and UP functions 145 are depicted in FIG. 1, one of skill in the art will recognize that any number of traffic control functions 135, CP functions 140, policy functions 143, and UP functions 145 may be included in the mobile core network 130.

The CP functions 140 operate on a control plane of the mobile core network 130 and provide services such as UE registration, UE connection management, UE mobility management, data session management, and the like. Examples of CP functions 140 include, but are not limited to, an Access and Mobility Management Function ("AMF"), a Session Management Function ("SMF"), and the like. The UP functions 145 provide user plane (e.g., data) services to the remote units 105. For example, a data connection between the remote unit 105 and a data network 150 is managed by a UP function 145.

In some embodiments, the traffic control function 135 is a network function that operates on both the control plane and the user plane. All traffic that can be switched or split is anchored in the traffic control function 135 as described below. The traffic control function 135 receives access switching rules and access splitting rules (collectively referred to as "access selection rules") from the policy function 143. The traffic control function 135 applies the access selection rules to determine when traffic should be switched or split between 3GPP and WLAN access. Thus, the traffic control function 135 provides ATSSS functionality. In addition, the traffic control function 135 may receive access traffic steering rules from the policy function 143 and may send these rules to the remote units 105. The traffic control function 135 maintains a control connection with the remote unit 105 (e.g., via an Na interface) over which the traffic control function 135 can send switch/split commands and steering rules to the remote unit 105.

The policy function 143 stores and provides to traffic control function 135 rules for access traffic steering, switching and splitting. In addition, the policy function 143 may provide to the UP functions 145 steering rules for steering certain data flows to the traffic control function 135. As used herein, access traffic steering rules refer to rules provided to the remote units 105 by the mobile core network 103. Access traffic steering rules are used by the remote units 105 for access selection when initiating a new data flow. As an example, an access traffic steering rule may indicate "select 3GPP access for app-x" or "select WLAN access for non-IMS traffic between 9 am and 5 pm."

Also as used herein, access traffic switching rules refer to rules used to determine when one or more data flows should be moved from 3GPP to WLAN or vice versa. As an example, an access traffic switching rule may indicate "move video streaming flows to WLAN when the 3GPP access gets congested," "move video streaming flows to WLAN when their duration exceeds 20 seconds," or "move data flows to WLAN when the data balance of subscriber exceeds 80%." Further, access traffic splitting rules, as used herein, refer to rules used to determine when one or more data flows should be split across 3GPP and WLAN accesses. The split of flows can facilitate bandwidth aggregation. As an example, an access traffic splitting rule may indicate "split HD video streaming flows for 'gold' subscribers when their duration exceeds 10 seconds." Accordingly, the present disclosure distinguishes between access traffic steering rules, access traffic switching rules, and access traffic splitting rules. Access traffic switching rules and access traffic splitting rules are collectively referred to herein as access traffic selection rules.

As depicted, a remote unit 105 may be connected to both a cellular base unit 110 and a non-cellular access network 120. The remote unit 105 establishes a control connection with the traffic control function 135. The control connection may be established either via the cellular base unit 110 or the non-cellular access network 120. Via this control connection, the remote unit 105 may receive steering rules which are applied for access selection (e.g., selecting between 3GPP and WLAN) when initiating a new data flow. Also, the remote unit 105 may receive switching and/or splitting commands from the traffic control function 135 when the traffic control function 135 determines to switch or split one or more data flows of the remote unit 105 (e.g., based on access traffic switching rules and/or access traffic splitting rules).

Figure 2:
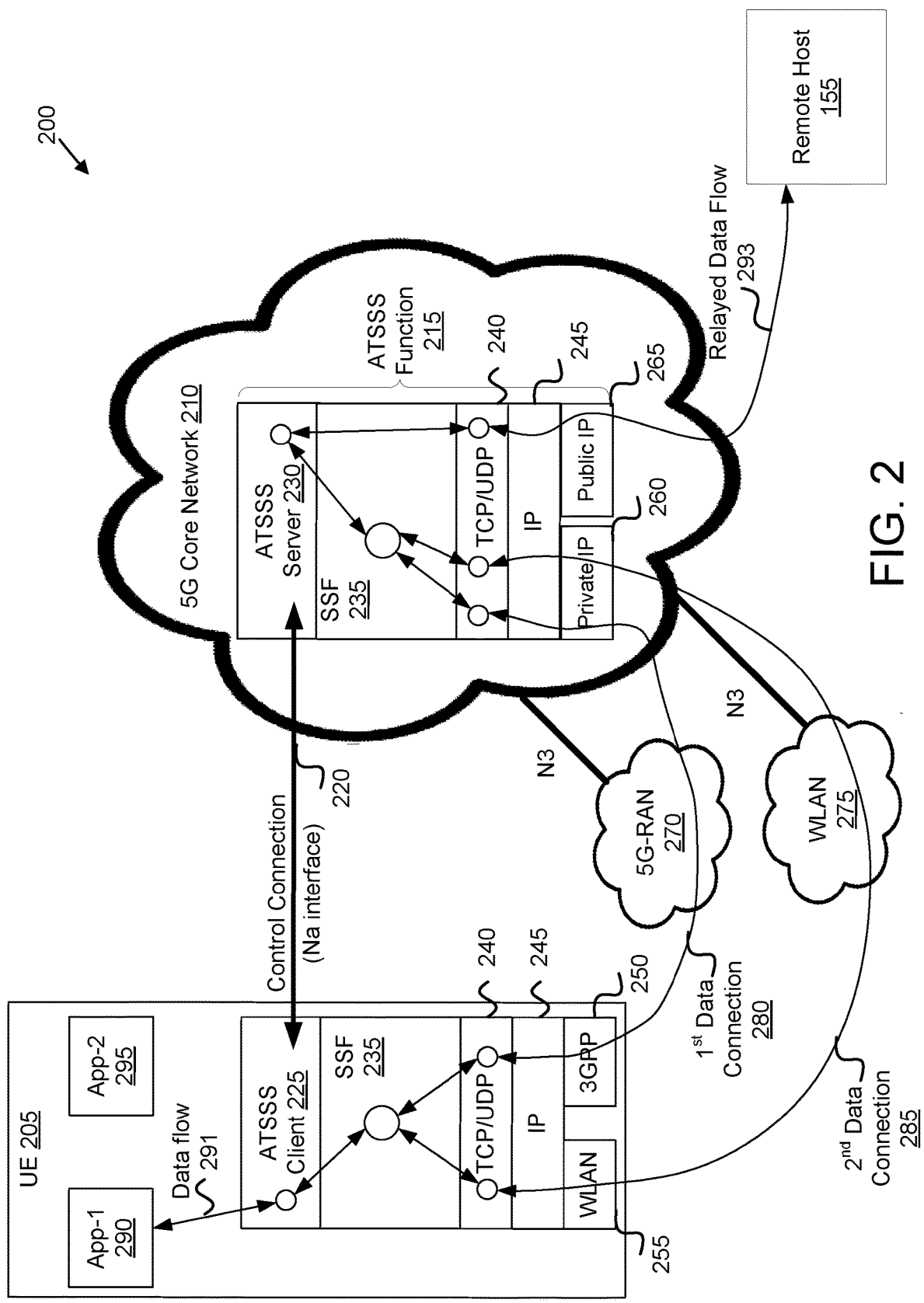
FIG. 2 is a block diagram illustrating one embodiment of a network architecture for access traffic steering, switching, and splitting.

FIG. 2 depicts a network architecture 200 used for access traffic steering, switching, and splitting, according to embodiments of the disclosure. The network architecture 200 may be a simplified embodiment of the wireless communication system 100. As depicted, the network architecture 200 includes a UE 205 that communicates with an Access Traffic Steering, Splitting, and Switching ("ATSSS") function 215 within a core network (here depicted as 5G core network 210). FIG. 2 also shows the protocols running in the UE 205 and the ATSSS function 215 to realize multiple access legs (e.g., over 3GPP and WLAN accesses) for a single data flow.

The UE 205 may be one embodiment of the remote unit 105 and the ATSSS function 215 may be one embodiment of the traffic control function 135. As depicted, a control connection 220 is established between the UE 205 and the ATSSS function 215. In one embodiment, the control connection utilizes an Na interface. The ATSSS function 215 may be a separate network function ("NF") within the core network, or may be implemented by one or more NFs in the core network, such as a MME in a LTE core network, a AMF in a 5G core network, or the like. Here, the ATSSS function 215 operates on both the control plane and the user plane of the 5G core network 210.

The UE 205 implements an ATSSS client 225, while the ATSSS function 215 implements a corresponding ATSSS server 230. The control connection 220 permits the ATSSS client 225 to communicate with the ATSSS server 230. The control connection 220 may be established either over the 5G-RAN 270 or over the WLAN 275. Both the UE 205 and the ATSSS function 215 also implement a switching/splitting function ("SSF") protocol layer 235, a TCP/UDP layer 240, and an IP layer 245.

As depicted, the UE 205 uses a 3GPP radio interface 250 to communicate with the 5G core network 210 via the 5G-RAN 270 and uses a WLAN radio interface 255 to communicate with the 5G core network 210 via the WLAN 275. The WLAN 275 may be an IEEE 802.11 WLAN, a Wi-Fi® hotspot, or the like. In certain embodiments, the 5G-RAN 270 and the WLAN 275 communicate with the 5G core network 210 over a N3 interface. Here, a first data connection 280 may be established between the UE 205 and the ATSSS function 215 via the 5G-RAN 270 and a second data connection 285 may be established between the UE 205 and the ATSSS function 215 via the WLAN 275.

The ATSSS function 215 communicates with the UE 205 using a private IP address 260. In one embodiment, one or more UP functions in the 5G core network 210 route traffic to the ATSSS function 215 that can be split and/or switched between the 5G-RAN 270 and the WLAN using the private IP address 260. The ATSSS function 215 also has a public IP address 265 with which it communicates with the remote host 155. The UE 205 includes at least one application (here, a first application 290 and a second application 295 are depicted) that generates a data flow 291. Here, the ATSSS server 230 relays traffic between the UE 205 and the remote host 155 using the private and public IP addresses 260, 265 (depicted as relayed data flow 293). The first data connection 280 is an access leg for the data flow 291 that utilizes the 5G-RAN 270, while the second data connection 285 is an access leg for the data flow 291 that utilizes the WLAN 275.

The ATSSS client 225 in the UE 205 and the ATSSS server 230 in the ATSSS function 215 are the two endpoints for the control connection 220. The ATSSS client 225 in the UE 205 receives switching and splitting commands from the ATSSS server 230 and configures the SSF protocol layer 235 in the UE 205 to operate according to these commands. For example, the ATSSS function 215 may instruct the UE 205 to initiate a new access leg for a data flow 291. As another example, the ATSSS function 215 may instruct the UE 205 to split the traffic of a data flow 291 across two access legs. As a further example, the ATSSS function 215 may instruct the UE 205 to switch the traffic of a data flow 291 from a first access leg (e.g., over the 5G-RAN 270) to a second access leg (e.g., over the WLAN 275), or vice versa.

The SSF protocol layer 235 operates on top of the TCP/UDP layer 240 and is responsible for creating one or more access legs for a data flow 291. The SSF protocol layer 235 then schedules the traffic of the data flow 291 across these access legs. The scheduling behavior of SSF protocol layer 235 is configured by the layer above SSF protocol layer 235 (e.g., by the ATSSS client 225 in the UE 205 and the ATSSS server 230 in the ATSSS function 215). The SSF protocol layer 235 may send all traffic of the data flow 291 onto one access leg (e.g., when configured in switch mode) or may send all traffic of the data flow 291 onto two access legs (e.g., when configured in split mode).

For TCP flows, the SSF protocol layer 235 operation may be based on a Multipath TCP ("MPTCP") protocol. Here, the ATSSS client 225 in the UE 205 and the ATSSS server 230 in the 5G core network 210 maintain an API with their SSF protocol layer 235 via which they can control the MPCTP behavior of the SSF protocol layer 235. In certain embodiments, aspects of MPTCP may be optimized using the control connection 220.

In certain embodiments, the UE 205 sends its IP addresses to the ATSSS function 215 via the control connection 220 and indicates which IP address is associated with the WLAN 275 and which IP address is associated with the 5G-RAN 270. Accordingly, when the ATSSS function 215 receives a new data flow 291, it is able to determine (by looking at the IP source address) whether the data flow 291 it is carried over the 5G-RAN 270 or the WLAN 275. In contrast, the address advertisement mechanism of MPTCP does not support such a capability.

In certain embodiments, when the ATSSS function 215 receives a new data flow 291 it can identify the UE 205 that originated this data flow 291 (again by looking at the IP source address). Accordingly, the ATSSS function 215 can enforce UE-specific switching and splitting policies, e.g. policies based on subscription information, policies based on the UE type, etc. Again, the address advertisement mechanism of MPTCP does not support such a capability.

In certain embodiments, UE 205 does not need to advertise its addresses (via the MPTCP ADD_ADDR option) every time it starts a new TCP connection. Instead, address addition or removal is implemented "out-of-band" (via the control connection 220) and applies to all ongoing TCP connections of the UE 205. For example, the UE 205 may send, over the control connection 220, a network address update in response to connecting to an access network and/or disconnecting from an access network.

Figure 3:
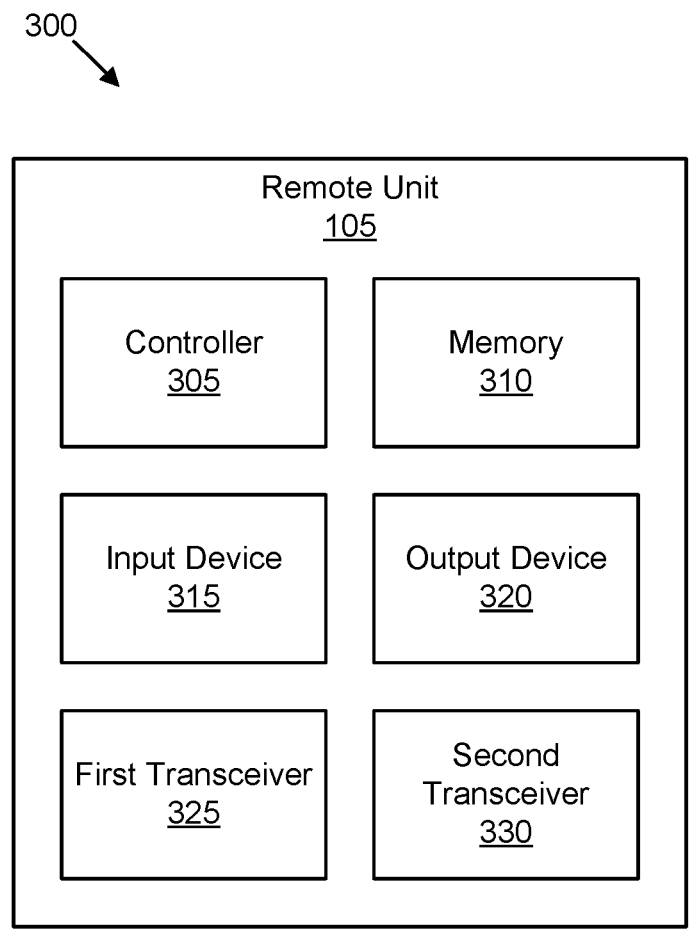
FIG. 3 is a schematic block diagram illustrating one embodiment of a remote apparatus for access traffic steering, switching, and splitting.

FIG. 3 depicts one embodiment of a remote apparatus 300 that may be used for access traffic steering, switching, and splitting, according to embodiments of the disclosure. The remote apparatus 300 includes one embodiment of the remote unit 105. Furthermore, the remote unit 105 may include a processor 305, a memory 310, an input device 315, a display 320, a first transceiver 325, and a second transceiver 330.

The first transceiver 325 communicates with a mobile communication network (e.g., a core network) over a first access network, while the second transceiver 330 communicates with the mobile communication network over a second access network. The first and second access networks facilitate communication between the mobile core network 130 and the remote apparatus 300. In one embodiment, the first access network is the 5G-RAN 270 or another cellular RAN and the second access network is the WLAN 275 or other non-cellular access network. In other embodiments, the first access network and second access network may be other types of access networks, the first access network being a different type of access network than the second. Each transceiver 325, 330 may include at least one transmitter and at least one receiver. Additionally, the transceivers 325, 330 may support at least one network interface such as an "Na" interface used for communications between the remote unit 105 and the traffic control function 135 (e.g., the ATSSS function 215 or its equivalent). In some embodiments, the input device 315 and the display 320 are combined into a single device, such as a touch screen. In certain embodiments, the remote unit 105 may not include any input device 315 and/or display 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, the first transceiver 325, and the second transceiver 330.

In some embodiments, the processor 305 establishes a control connection (e.g., control connection 220) with a traffic control function (e.g., traffic control function 135) within a mobile communication network. Note that the control connection may be established either over the first access network or over the second access network. Here, the access network over which the control connection is established is considered the "first" access network. In certain embodiments, the traffic control function is an ATSSS function 215. In other embodiments, the traffic control function may be a MME, an AMF, or other network function of the mobile core network 130 or 5G core network 210. In some embodiments, the control connection is a TCP connection. In certain embodiments, establishing the control connection includes the processor 305 performing mutual authentication with the traffic control function.

The processor 305 identifies a first network address (e.g., first IP address) for the remote apparatus 300 associated with a first access network. In certain embodiments, the first network address is assigned to the remote apparatus 300 when the remote apparatus 300 connects to the first access network. The processor 305 also identifies a second network address (e.g., second, different, IP address) for the remote apparatus 300 associated with a second access network (e.g., accessed using the second transceiver 330). In certain embodiments, the second network address is assigned to the remote apparatus 300 when the remote apparatus 300 connects to the second access network (e.g., after the remote apparatus 300 associates with an access point of the non-cellular access 120).

The processor 305 transmits, over the control connection, the first network address (e.g., associated with the first access network) and the second network address (e.g., associated with the second access network). Additionally, the processor 305 transmits a first set of data flows (e.g., including the data flow 291) over the first access network. Note that the first set of data flows is not transmitted over the control connection. In certain embodiments, the processor 305 establishes a first TCP data connection over the first access network (e.g., first data connection 280) and transmits the first set of data flows using the first TCP data connection. Note that the TCP data connection is used to transfer user data traffic, but not to transfer control signaling.

The processor 305 receives a command from the traffic control function (e.g., the ATSSS function 215) over the control connection. Here, the command instructs the processor 305 to utilize the second access network for at least some of the traffic of the data flows in a subset of the first set of data flows (e.g., to include the data flow 291). In some embodiments, the command identifies each data flow in the subset. In one embodiment, the processor 305 receives instructions to establish an access leg of a multipath connection over the second access network. In another embodiment, the processor 305 receives instructions to activate a previously established access leg of a multipath connection over the second access network.

In response, the processor 305 transmits at least some traffic of the subset over the second access network, conforming to the command. Here, the processor 305 may establish a second TCP data connection over the second access network (e.g., the second data connection 285) and transmit traffic of the subset using the second TCP data connection. The processor 305 may establish the first and second TCP connections via user plane ("UP") functions of the mobile communication network, with the UP functions routing traffic to the traffic control function based on pre-configured routing rules. In certain embodiments, the processor 305 establishes the second TCP data connection without closing the first TCP data connection. In certain embodiments, the command includes a target address (e.g., private IP address 260) belonging to the traffic control function and the processor 305 sends the traffic of the data flows in the subset to the target address over the second access network.

In some embodiments, the command to utilize the second access network is a command to transfer a first portion of the traffic of each data flow in the subset (e.g., including a first portion of the data flow 291) over the first access network and a second portion of the traffic of each data flow in the subset (e.g., including a second portion of the data flow 291) over the second access network, thereby splitting the traffic over both the first access network and the second access network. In such embodiments, the processor 305 may transmit the first portion over the first TCP data connection and the second portion over the second TCP data connection. This scenario is discussed in greater detail below with reference to FIG. 8.

In some embodiments, the command to utilize the second access network is a command to transfer all traffic of each data flow in the subset from the first access network to the second access network, thereby switching the traffic from the first access network to the second access network. In such embodiments, the processor 305 may transmit all traffic of each data flow of the subset over the second TCP data connection while maintaining the first TCP data connection. Here, the first TCP data connection may be placed in an inactive state, but the connection is not closed. At a later point in time, the processor 305 may receive a second command from the traffic control function to switch all traffic of each data flow in the subset back to the first access network. Because of the processor 305 maintaining the first TCP data connection after switching traffic to the second access network, the first TCP data connection will not need to be established anew. This scenario is discussed in greater detail below with reference to FIG. 9.

In some embodiments, the processor 305 transmits, over the control connection, a network address update to the traffic control function. For example, the processor 305 may send the network address update in response to the remote apparatus 300 connecting to an access network (and receiving a new network address). As another example, the processor 305 send the network address update in response to the remote apparatus 300 disconnecting from an access network. Such network address updates facilitate efficient transfer of traffic to the remote apparatus 300.

In some embodiments, the processor 305 receives access steering rules over the control connection. Here, the access steering rules indicate on which access network the remote apparatus 300 is to establish a new data flow.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to access traffic steering, switching, and splitting, for example storing network addresses, protocol stacks, security keys, messages, access steering rules, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The first transceiver 325 communicates with a mobile communication network via a first access network, while the second transceiver 330 communicates with the mobile communication network via a second access network. In one embodiment, the first access network is an embodiment of the cellular base units 110 and/or the 5G-RAN 270, while the second access network is an embodiment of the non-3GPP access network 120 and/or the WLAN 275. In another embodiment, the first access network is an embodiment of the non-3GPP access network 120 and/or the WLAN 275, while the second access network is an embodiment of the cellular base units 110 and/or the 5G-RAN 270. In other embodiments, the first access network and second access network may be other types of access networks, the first access network being a different type of access network than the second.

The transceivers 325 and 330 operate under the control of the processor 305 to transmit messages, data, and other signals and also to receive messages, data, and other signals. For example, the processor 305 may selectively activate one or both of the transceivers 325, 330 (or portions thereof) at particular times in order to send and receive messages. The first transceiver 325 may include one or more transmitters and one or more receivers for communicating over the first access network. Similarly, the second transceiver 330 may include one or more transmitters and one or more receivers for communicating over the second access network. As discussed above, the first transceiver 325 and the second transceiver 330 may support one or more the network interfaces for communicating with the mobile communication network.

Figure 4:
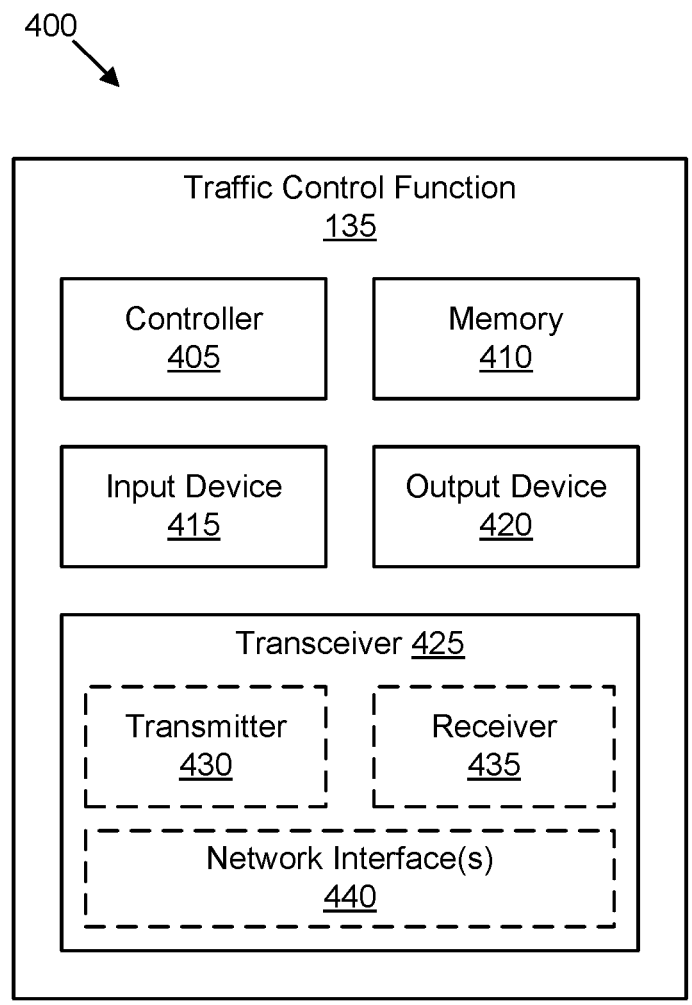
FIG. 4 is a schematic block diagram illustrating one embodiment of a traffic control apparatus for access traffic steering, switching, and splitting.

FIG. 4 depicts one embodiment of a traffic control apparatus 400 that may be used for access traffic steering, switching, and splitting, according to embodiments of the disclosure. The traffic control apparatus 400 includes one embodiment of the traffic control function 135. Furthermore, the traffic control function 135 may include a processor 405, a memory 410, an input device 415, a display 420, and a transceiver 425. In some embodiments, the input device 415 and the display 420 are combined into a single device, such as a touchscreen. In certain embodiments, the traffic control function 135 may not include any input device 415 and/or display 420.

As depicted, the transceiver 425 includes at least one transmitter 430 and at least one receiver 435. Additionally, the transceiver 425 may support at least one network interface 440 such as an "Na" interface used for communications between a UE and the ATSSS function 215 (or its equivalent). Here, the network interface 440 facilitates communication with a remote unit, such as the remote unit 105, the UE 205, and/or the remote apparatus 300. Additionally, the at least one network interface 440 may include an "Nau" interface used for communications between user plane functions and the ATSSS function 215 (or its equivalent).

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 establishes a control connection (e.g., control connection 220) with the remote unit. In one embodiment, the control connection utilizes a TCP connection. In certain embodiments, the processor 405 may perform mutual authentication with the remote unit when establishing the control connection. In certain embodiments, the processor 405 provides access steering rules to the remote unit over the control connection. Here, the access steering rules indicate on which access network the remote unit is to establish a new data flow. In one embodiment, the processor 405 requests the access steering rules from a policy control function in the mobile core network 130 in response to establishing the control connection with the remote unit. Here, the processor 405 forwarding the access steering rules to the remote unit from the policy control function.

In certain embodiments, the processor 405 receives a plurality of network addresses (e.g., IP addresses) belonging to the remote unit over the control connection. Here, the remote unit uses each of the plurality of network addresses to communicate over a different access network. For example, the plurality of network addresses may include a first address to communicate over a first access network, a second address to communicate over a second access network, etc. In one embodiment, the processor 405 receives a first network address used to communicate over a radio access network, such as the 5G-RAN 270. In a further embodiment, the processor 405 may receive a second network address used to communicate over a wireless local area network, such as the WLAN 275.

The processor 405 receives a first set of data flows (e.g., including the data flow 291) transmitted by the remote unit over a first access network. Here, the path of the first set of data flows does not include the control connection. In one embodiment, the processor 405 utilizes a first TCP data connection (e.g., the first data connection 280) to receive the first set of data flows over the first access network. In certain embodiments, receiving a plurality of data flows comprises the traffic control apparatus 400 receiving UP traffic from UP functions of a mobile core network 130. Here, the UP functions route traffic to the traffic control apparatus 400 based on preconfigured routing rules.

In some embodiments, receiving the first set of data flows transmitted by the remote unit over the first access network includes the processor 405 receiving a plurality of data flows and observing a source address of each of the plurality of data flows. The processor 405 then identifies as the first set of data flows those data flows whose source address matches a network address used by the remote unit to communicate over the first access network.

The processor 405 relays each data flow in the first set of data flows to a remote host (e.g., the remote host 155). At some point in time, the processor 405 determines that a subset of the first set of data flows is to utilize both the first access network and the second access network. In one embodiment, the processor 405 determines to split the subset of the first set of data flows between both the first access network and the second access network. In another embodiment, the processor 405 determines to switch the access path of the subset of the first set of data flows from the first access network to the second access network.

The processor 405 sends a command to the remote unit over the control connection to utilize the second access network for at least some of the traffic of each data flow in the subset of the first set of data flows. In some embodiments, the command identifies each data flow in the subset. Here, the processor 405 signals the remote unit to activate a previously established data connection over the second access network when sending the command to utilize the second access network. In certain embodiments, the processor 405 selects all or a portion of the first set of data flows based on preconfigured access selection rules.

In some embodiments, the command includes a target address belonging to the traffic control apparatus 400. Here, the processor 405 signaling the remote unit to send at least some traffic of each data flow in the subset to the target address over the second access network when sending the command to utilize the second access network. In certain embodiments, the processor 405 signals the remote unit to establish a data connection over the second access network when sending the command to utilize the second access network for at least some of the traffic of each data flow in the subset.

In certain embodiments, the processor 405 determines to split each data flow of the subset of the first set of data flows across the first access network and the second access network. In such embodiments, sending the command to utilize the second access network includes the processor 405 signaling the remote unit to transfer a first portion of the traffic of each data flow in the subset over the first access network and a second portion of the traffic of each data flow in the subset over the second access network. This scenario is discussed in greater detail below with reference to FIG. 8.

In certain embodiments, the processor 405 determines to switch the subset of the first set of data flows from the first access network to second access network. In such embodiments, sending the command to utilize the second access network includes the processor 405 signaling the remote unit to transfer all traffic of each data flow in the subset from the first access network to the second access network. This scenario is discussed in greater detail below with reference to FIG. 9.

In some embodiments, the processor 405 receives a second set of data flows transmitted by the remote unit over the second access network corresponding to the subset of the first data flows. Here, the processor 405 relays each data flow in the second set of data flows to a corresponding remote host. In certain embodiments, the processor 405 receives a network address update from the remote unit over the control connection. The network address update may be in response to the remote unit connecting to and/or disconnecting from an access network.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to access traffic steering, switching, and splitting, for example storing network addresses belonging to a remote unit, protocol stacks, messages, security keys, steering policy rules, remote unit context, and the like. In certain embodiments, the memory 410 also stores program code and related data, such as an operating system or other controller algorithms operating on the traffic control apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the cellular base unit 110.

Figure 5:
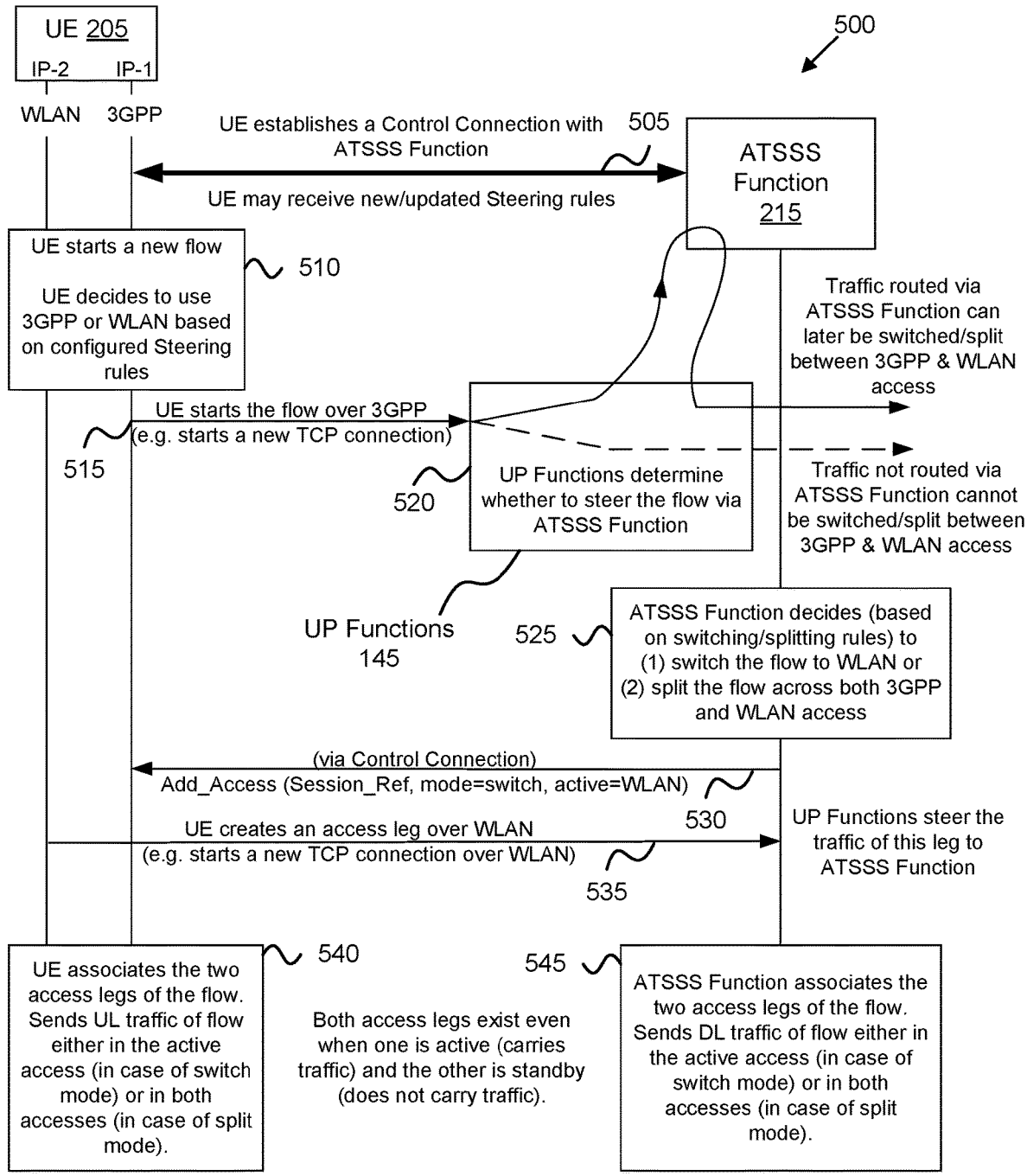
FIG. 5 is a block diagram illustrating one embodiment of a network procedure for access traffic steering, switching, and splitting.

FIG. 5 depicts a network procedure 500 for access traffic steering, switching, and splitting, according to embodiments of the disclosure. The network procedure 500 involves the UE 205, the ATSSS function 215 and one or more UP functions 145. Here, the UE 205 has a first IP address ("IP-1") associated with 3GPP access (e.g., via the cellular base units 110 and/or the 5G-RAN 270) and a second IP address ("IP-2") associated with WLAN access (e.g., via the non-3GPP access 120 and/or the WLAN 275).

The network procedure 500 begins as the UE 205 establishes a control connection (e.g., the control connection 220) with the ATSSS function 215 (see transaction 505). The control connection may be a TCP connection over a Na interface. In some embodiments, the UE 205 and the ATSSS function 215 perform mutual authentication when establishing the control connection. For example, the UE 205 and ATSSS function 215 may be mutually authenticated using procedures similar to those used when a UE and an ANDSF in EPC are mutually authenticated. Note that the ATSSS function 215 may provide the UE 205 with traffic steering rules (e.g., new or updated rules) upon establishing the control connection. Here, the control connection 220 is depicted as being established over the 3GPP access; however, in other embodiments the control connection 220 may be established over the WLAN access.

Additionally, the UE 205 informs the ATSSS function 215 of its IP address over the 3GPP access and of its IP address over the WLAN access (e.g., IP-1 and IP-2). In one embodiment, the ATSSS function 215 uses these addresses to determine if the UE 205 has connectivity to both access networks. In another embodiment, the ATSSS function 215 uses the addresses to determine (by looking at the IP source address) which of a plurality of UEs is associated with a data flow and which access is being used for this data flow.

Next, the UE 205 decides to start a new data flow (e.g., the data flow 291). Here, the UE 205 determines which access to use based on the configured steering rules (see block 510). The UE 205 starts the data flow over the selected access, here depicted as the 3GPP access. In certain embodiments, starting the data flow includes starting a new TCP data connection over the selected access. In other embodiments, the UE 205 may use an established TCP data connection for the new data flow.

In one embodiment, the data flow is received by one or more UP functions 145 which determine whether to steer the data flow to the ATSSS function 215 (see block 520). Here, the ATSSS function 215 operates as a transparent TCP/UDP proxy, such that the UE 205 does not know if its traffic goes through the ATSSS function 215. Traffic initiated by the UE 205 can be steered to the ATSSS function 215 via steering rules provided to UP functions 145, for example by the policy function 143. These steering rules are used to determine which traffic to send to the ATSSS function 215.

In an alternate embodiment, the ATSSS function 215 may be a socket secure ("SOCKS") proxy to the UE 205, such that the UE 205 is aware whether its traffic goes through the ATSSS function 215. Here, the UE 205 sends some and/or all of its data flows to an IP address of ATSSS function 215 and therefore the UP functions need not be configured with steering rules by the policy function. In this scenario, the UE 205 may be provided with the steering rules discussed above to determine which traffic to send to the ATSSS function 215.

In either alternative, traffic (e.g., data flows) steered to the ATSSS function 215 (e.g., those anchored by the ATSSS function 215), can later be switched and/or split between the various access networks available to the UE 205 (e.g., the 3GPP access and the WLAN access). However, the data flows not anchored by the ATSSS function 215 cannot be switched and/or split between the various access networks available to the UE 205.

In one embodiment, the ATSSS function 215 may expose a private IP address that is only accessible via the 5G core network. In another embodiment, the ATSSS function 215 may expose a public IP address that is accessible via the public Internet. In certain embodiments, the ATSSS function 215 may expose both a private IP address and a public IP address.

The ATSSS function 215 determines whether to utilize a second access network (here the WLAN access) for those data flows anchored at the ATSSS function 215 (see block 525). Here, a portion (e.g., subset) of the data flows anchored at the ATSSS function 215 may be selected to utilize the second access network, for example by switching and/or splitting the data flows. The ATSSS function is provisioned with a switching/steering policy whose rules indicate under what conditions to switch and/or split a data flow.

Note that all data flows which may be switched or split between 3GPP and WLAN are anchored at the ATSSS function 215. When the ATSSS function 215 decides to switch or split a data flow, it sends a command to UE 205 via the control connection. In the depicted embodiment, the ATSSS function determines to switch a data flow from the 3GPP access to the WLAN access and sends an Add_Access message to the UE 205 to establish a new access leg for this flow (see transaction 530). Here, the Add_Access message includes a session reference parameter ("Session_Ref") used to indicate to which data flow(s) the Add_Access message pertains. The Add_Access message also includes a mode parameter that instructs the UE 205 to enter a switch mode. In certain embodiments, the Add_Access message includes an active access leg parameter that indicates which access leg(s) are to be active. For the "switch" command the active access leg parameter indicates to which access leg the data flow is to be switched. For a "split" command the active access leg parameter may be omitted as redundant (e.g., where only two different access networks are available). In the depicted embodiment, the Add_Access message indicates that the UE 205 is to switch traffic of a data flow to the WLAN access.

In response to the Add_Access message, the UE 205 creates an access leg over the WLAN access (see transaction 535. The UP functions 145 steer traffic of this WLAN access leg to the ATSSS function 215. In one embodiment, the UE 205 starts a new TCP connection over the WLAN access. In another embodiment, the UE 205 may activate a previously established TCP connection that utilizes the WLAN access. Next, the UE 205 and the ATSSS function 215 both associate the two access legs of the data flow (see blocks 540 and 545).

In case of a TCP flow, a new access leg is established by creating a new TCP connection over the new access. The new and the old TCP connections over 3GPP and WLAN accesses are associated with each other, allowing the ATSSS function 215 to identify traffic of the switched data flow. The operation of the two associated TCP connections is based on the Multipath TCP (MPTCP) protocol. In case of a UDP flow, a new access leg is established by creating a new UDP association (being defined by a new 5-tuple) between the UE 205 and the ATSSS function 215 over the new access.

Thereafter, the UE 205 sends UL traffic of the data flow on the active access leg (where the Add_Access message instructed the UE 205 to switch the flow) or on both access legs (where the Add_Access message instructed the UE 205 to split the flow). Similarly, the ATSSS function 215 sends DL traffic of the data flow on the active access leg (where the Add_Access message instructed the UE 205 to switch the flow) or on both access legs (where the Add_Access message instructed the UE 205 to split the flow). Note that in the switching scenario, the original access leg is maintained in a standby state where the connection still exists even though no traffic is carried by the connection.

Figure 6:
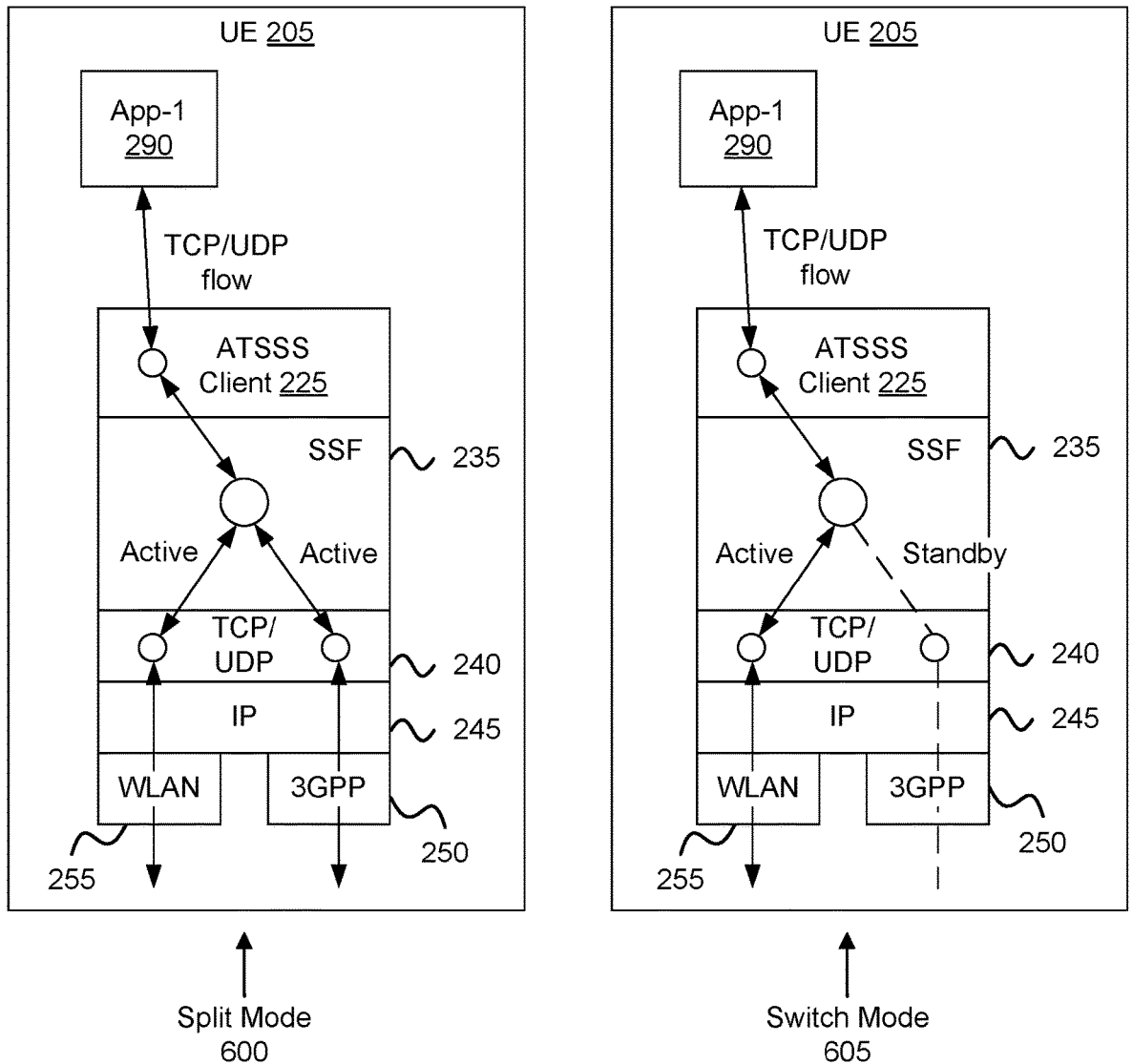
FIG. 6 is a block diagram illustrating embodiments of protocol stacks used for access traffic switching and splitting.

FIG. 6 depicts protocol stacks corresponding to different SSF modes used for access traffic switching and splitting, according to embodiments of the disclosure. The depicted protocol stacks are implemented in the UE 205 and correspond to those shown in FIG. 2. Specifically, the UE 205 includes a first application 290 which generates a TCP/UDP data flow (e.g., the data flow 291), an ATSSS client 225, a SSF protocol layer 235, a TCP/UDP layer 240, an IP layer 245, a 3GPP radio interface 250, and a WLAN radio interface 255, as described with reference to FIG. 2.

When the UE 205 enters a split mode 600, the SSF protocol layer 235 establishes a new access leg over the WLAN 275 and maintains two active access legs: one via the 3GPP radio interface 250 and another via the WLAN radio interface 255. When the UE 205 enters a switch mode 605, the SSF protocol layer 235 also establishes a new access leg over the WLAN 275. However, for the switch mode the SSF protocol layer 235 deactivates the access leg via the 3GPP radio interface 250. Accordingly, the UE 205 maintains the 3GPP access leg in a standby state and does not pass traffic over the deactivated access leg. Rather, all traffic of the TCP/UDP flow is sent over the active access leg (via the WLAN radio interface 255).

Figure 7:
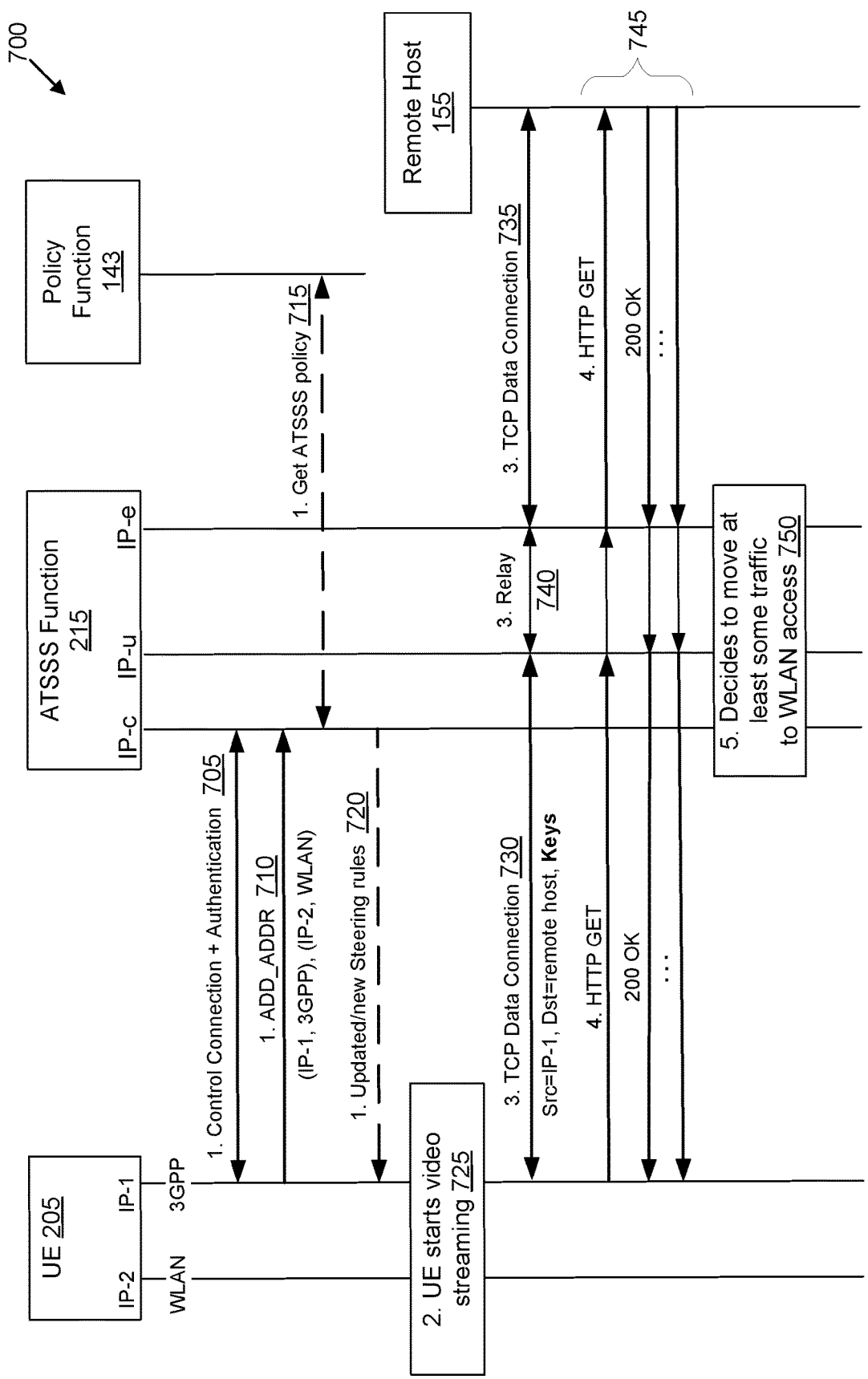
FIG. 7 is a block diagram illustrating one embodiment of a network procedure for determining to move at least some traffic to a second access network.

FIG. 7 depicts a network procedure 700 for determining to move at least some traffic to a second access network, according to embodiments of the disclosure. Here, the network procedure 700 involves the UE 205, the ATSSS function 215, the policy function 143, and the remote host 155. The UE 205 has a first IP address ("IP-1") associated with 3GPP access (e.g., via the cellular base units 110 and/or the 5G-RAN 270) and a second IP address ("IP-2") associated with WLAN access (e.g., via the non-3GPP access 120 and/or the WLAN 275). The ATSSS function has a pair of internal IP addresses, here a control plane IP address ("IP-c") and a user plane IP address ("IP-u"), visible to the UE 205 and an external IP address ("IP-e") visible to the remote host 155.

The network procedure 700 begins and the UE 205 establishes a control connection (e.g., control connection 220) with the ATSSS function 215 (see transaction 705). In the depicted embodiment, the control connection is established over the 3GPP access; however, in other embodiments the control connection may be established over the WLAN access. The control connection uses the control plane IP address ("IP-c") of the ATSSS function 215. The control plane IP address can either be pre-configured or discovered by the UE 205 (e.g. via DNS lookups). Here, establishing the control connection includes mutual authentication between the UE 205 and the ATSSS function 215.

After the mutual authentication, the UE 205 sends to the ATSSS function 215 its IP address over WLAN and its IP address over 3GPP access (see transaction 710). Here, the UE 205 uses an ADD_ADDR message to indicate its IP addresses and an access type associated with each IP address. Accordingly, the ATSSS function 215 is informed that the UE 205 is connected to both accesses. Further, the ATSSS function 215 can later identify when the UE 205 initiates a new data flow over WLAN or over 3GPP access (e.g., by looking at the IP source address).

In certain embodiments, the ATSSS function 215 may send new (or updated) steering rules to UE 205 (see transaction 720). Here, the steering rules are used for access selection every time the UE 205 initiates a new data flow. In one embodiment, the ATSSS function 215 first requests the new/updated steering rules from the policy function 143. Alternatively, the UE 205 may receive these rules directly from the policy function 143.

At some future period, the UE 205 starts a TCP-based video streaming flow toward a remote host 155 in the Internet (see block 725). The UE 205 selects an initial access network for the video streaming flow based on the configured steering rules. As depicted, the UE 205 starts the video streaming flow over the 3GPP access.

When starting the video streaming flow, the UE 205 initiates a TCP data connection to the remote host 155 (see transaction 730). Here, this TCP data connection is steered by the UP functions in a 5G core network to the ATSSS function 215. The ATSSS function 215 terminates the TCP data connection, initiates a second TCP connection to the remote host via its external IP address ("IP-e") which is accessible from the Internet (see transaction 735), and relays the video streaming flow between the two TCP connections (see transaction 740).

By looking at the IP source address, the ATSSS function 215 identifies the UE 205 that originated this flow and the access being used (here, the 3GPP access). In some embodiments, the TCP connection between the UE 205 and the ATSSS function 215 is an MPTCP connection. As such, the TCP connection carries a MP_CAPABLE option and exchanges, e.g., 64-bit keys between the UE and ATSSS function 215. These keys are used for authenticating and associating future TCP connections with the existing TCP connection.

Next, TCP/HTTP traffic is exchanged between the UE 205 and the remote host 155 via the ATSSS function 215, which relays traffic between the internal and external TCP connections (see transactions 745).

At some point, the ATSSS function 215 decides (e.g., based on access selection rules received from the policy function 143) to move at least a portion of the video streaming flow to the WLAN access (see block 750). Recall that the ATSSS function 215 knows the UE 205 is connected to a WLAN because the UE 205 has advertised an IP address for WLAN access (e.g., IP-2) in the ADD_ADDR message.

In one embodiment, the ATSSS function 215 determines (based on the access selection rules) to split traffic of the video streaming flow over both the 3GPP access and the WLAN access. This scenario is described below with reference to FIG. 8. In another embodiment, the ATSSS function 215 determines (based on the access selection rules) to switch traffic of the video streaming flow over both the 3GPP access and the WLAN access. This scenario is described below with reference to FIG. 9. Via the control connection, the ATSSS function 215 instructs the UE 205 to begin to utilize the second access network (here the WLAN access).

Figure 8:
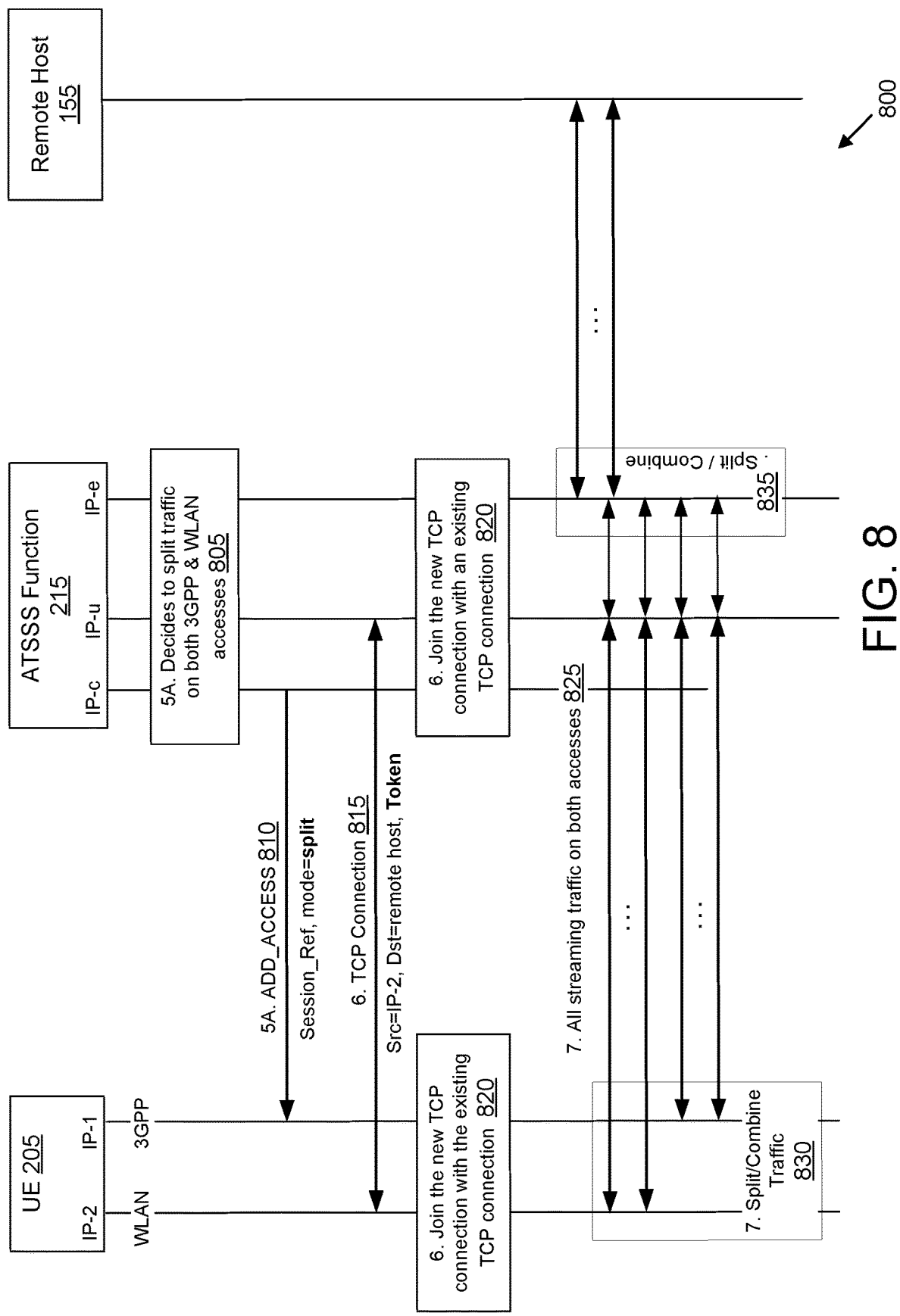
FIG. 8 is a block diagram illustrating one embodiment of a network procedure for splitting traffic between two access networks.

FIG. 8 depicts a network procedure 800 for splitting traffic between two access networks, according to embodiments of the disclosure. The network procedure 800 is a continuation of the network procedure 700. The network procedure 800 addresses the situation where the ATSSS function 215 determines that the UE 205 switch the video streaming flow from the 3GPP access to the WLAN access. Here, the network procedure 800 involves the UE 205, the ATSSS function 215, and the remote host 155.

As discussed above, the UE 205 has a first IP address ("IP-1") associated with 3GPP access (e.g., via the cellular base units 110 and/or the 5G-RAN 270) and a second IP address ("IP-2") associated with WLAN access (e.g., via the non-3GPP access 120 and/or the WLAN 275). The ATSSS function has a pair of internal IP addresses, here a control plane IP address ("IP-c") and a user plane IP address ("IP-u"), visible to the UE 205 and an external IP address ("IP-e") visible to the remote host 155.

The network procedure 800 begins with the ATSSS function 215 deciding (e.g. based on the switching rules received from the policy function) to split the video streaming flow on both the 3GPP access and the WLAN access (see block 805). This decision corresponds to block 750 in FIG. 7. Here, the ATSSS function 215 knows the UE 205 is connected to a WLAN because the UE (in step 1) has advertised an IP address for WLAN access (IP-2).

Via the control connection (e.g., control connection 220), the ATSSS function 215 sends an ADD_ACCESS request to UE 205 (see transaction 810). Here, the ADD_ACCESS request instructs the UE 205 to establish an access leg over WLAN access (e.g., to establish the second data connection 285). In certain embodiments, the ADD_ACCESS request includes a session reference parameter ("Session_Ref") which references the existing TCP connection previously established over 3GPP access. The ADD_ACCESS request may also indicate that the new access leg should be established over WLAN access and that the two access legs should operate in split mode (e.g., with both access legs being active).

In some embodiments, the ADD_ACCESS request may request the UE 205 to establish an additional access leg for several existing data flows (not only for one). Here, the session reference parameter may reference multiple TCP sessions. This way the ATSSS function 215 may request the UE 205 to split several data flows to WLAN access with a single ADD_ACCESS request. The indicated data flows may be all or a portion of the UE 205's data flows anchored by the ATSSS function 215 (e.g., selected based on preconfigured access selection rules). In certain embodiments, the UE 205 may reject the ADD_ACCESS request. For example, if the UE 205 determines that the WLAN signal strength is too low or has another indication that the WLAN access may be unreliable, then the UE 205 may reject the ADD_ACCESS request.

In response to the ADD_ACCESS request, an ATSSS client in the UE 205 (e.g., the ATSSS client 225) instructs a SSF protocol layer in the UE 205 to establish a new leg for the existing MPTCP connection. Accordingly, the UE 205 initiates a new TCP connection (see transaction 815). Here, the new TCP connection may carry an MPTCP MP_JOIN option having a token. The token in the MP_JOIN option is used for authenticating this new TCP connection and joining it with the existing TCP connection. As depicted, the new TCP connection is also associated with a source IP address (e.g., IP-2 of the WLAN access) and a destination IP address (e.g., of the remote host 155).

Accordingly, the UE 205 and the ATSSS function 215 both join the new TCP connection with the existing TCP connection (see blocks 820). After establishing the new access leg, the UE 205 and the ATSSS function 215 forward all data flow traffic over both the 3GPP access and the WLAN access (see transactions 825). Note that to do so, the UE 205 splits UL traffic of the video streaming flow and sends a first portion of the flow over the 3GPP access and a second portion over the WLAN access (see block 830). The UE 205 also combines DL traffic of the video streaming flow received over both the 3GPP access and the WLAN access, for example using MPTCP procedures. Similarly, the ATSSS function 215 splits DL traffic of the video streaming flow and sends a first portion of the flow over the 3GPP access and a second portion over the WLAN access (see block 835). The ATSSS function 215 also combines UL traffic of the video streaming flow received over both the 3GPP access and the WLAN access, for example using MPTCP procedures. The ATSSS function 215 relays the recombined traffic to the remote host 155.

Figure 9:
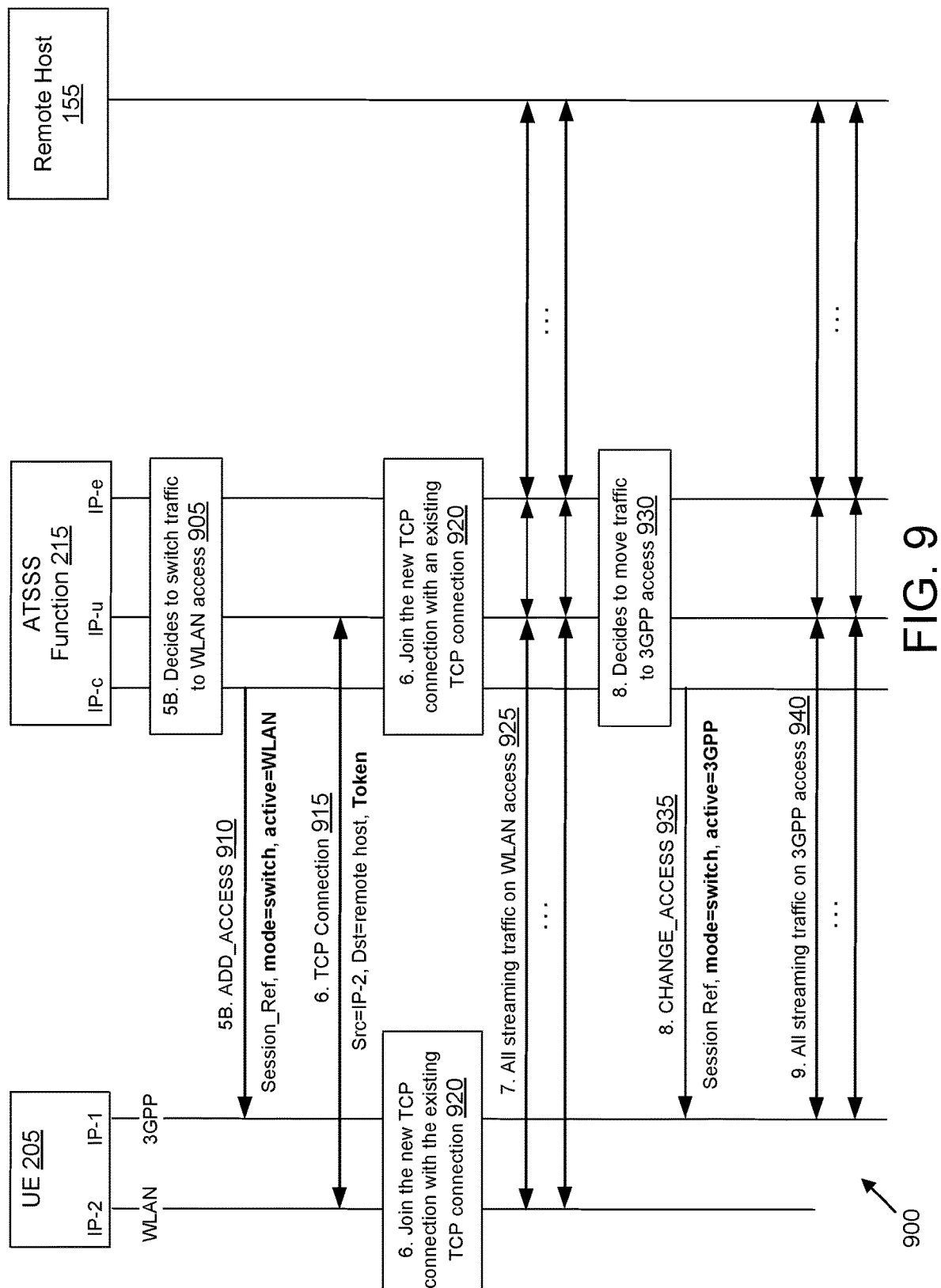
FIG. 9 is a block diagram illustrating one embodiment of a network procedure for switching traffic between two access networks.

FIG. 9 depicts a network procedure 900 for switching traffic between two access networks, according to embodiments of the disclosure. The network procedure 900 is also a continuation of the network procedure 700 discussed above with reference to FIG. 7. The network procedure 900 is an alternative to the network procedure 800 and addresses the situation where the ATSSS function 215 determines that the UE 205 switch the video streaming flow from the 3GPP access to the WLAN access. Here, the network procedure 900 involves the UE 205, the ATSSS function 215, and the remote host 155.

As discussed above, the UE 205 has a first IP address ("IP-1") associated with the 3GPP access (e.g., via the cellular base units 110 and/or the 5G-RAN 270) and a second IP address ("IP-2") associated with the WLAN access (e.g., via the non-3GPP access 120 and/or the WLAN 275). The ATSSS function has a pair of internal IP addresses, here a control plane IP address ("IP-c") and a user plane IP address ("IP-u"), visible to the UE 205 and an external IP address ("IP-e") visible to the remote host 155.

The network procedure 900 begins with the ATSSS function 215 deciding (e.g. based on the switching rules received from the policy function) to switch the video streaming flow from the 3GPP access to the WLAN access (see block 905). This decision corresponds to block 750 in FIG. 7. Here, the ATSSS function 215 knows the UE 205 is connected to a WLAN because the UE (in step 1) has advertised an IP address for WLAN access (IP-2).

Via the control connection (e.g., control connection 220), the ATSSS function 215 sends an ADD_ACCESS request to UE 205 (see transaction 910). Here, the ADD_ACCESS request instructs the UE 205 to establish an access leg over WLAN access (e.g., to establish the second data connection 285). In certain embodiments, the ADD_ACCESS request includes a session reference parameter ("Session_Ref") which references the existing TCP connection previously established over 3GPP access. The ADD_ACCESS request may also indicate that the new access leg should be established over WLAN access and that the two access legs should operate in switch mode with the WLAN leg being the active one.

In some embodiments, the ADD_ACCESS request may request the UE 205 to establish an additional access leg for several existing data flows (not only for one). Here, the session reference parameter may reference multiple TCP sessions. This way the ATSSS function 215 may request the UE 205 to move several data flows to WLAN access with a single ADD_ACCESS request. The indicated data flows may be all or a portion of the UE 205's data flows anchored by the ATSSS function 215 (e.g., selected based on preconfigured access selection rules). In certain embodiments, the UE 205 may reject the ADD_ACCESS request. For example, if the UE 205 determines that the WLAN signal strength is too low or has another indication that the WLAN access may be unreliable, then the UE 205 may reject the ADD_ACCESS request.

In response to the ADD_ACCESS request, an ATSSS client in the UE 205 (e.g., the ATSSS client 225) instructs a SSF protocol layer in the UE 205 to establish a new leg for the existing MPTCP connection. Accordingly, the UE 205 initiates a new TCP connection (see transaction 915). Here, the new TCP connection may carry an MPTCP MP_JOIN option with a token. The token in the MP_JOIN option is used for authenticating this new TCP connection and joining it with the existing TCP connection. As depicted, the new TCP connection is also associated with a source IP address (e.g., IP-2 of the WLAN access) and a destination IP address (e.g., of the remote host 155).

Accordingly, the UE 205 and the ATSSS function 215 both join the new TCP connection with the existing TCP connection (see blocks 920). After establishing the new access leg, the UE 205 and the ATSSS function 215 forward all data flow traffic over the WLAN access (see transactions 925).

At a later point in time, the ATSSS function 215 may decide to move the data flow traffic back to 3GPP access (see block 930). Because the UE has already a 3GPP access leg (e.g., in standby mode), the ATSSS function 215 sends a CHANGE_ACCESS request to UE 205 (see transaction 935). The CHANGE_ACCESS request instructs the UE 205 to activate the 3GPP access leg back and to switch the video streaming flow back to the 3GPP access. In certain embodiments, the CHANGE_ACCESS request includes a session reference parameter ("Session_Ref") which references the existing TCP connections previously established over both the 3GPP access and the WLAN. The CHANGE_ACCESS request may also indicate that two access legs should operate in switch mode with the 3GPP leg being the active one In response to the CHANGE_ACCESS request, the ATSSS client in the UE 205 instructs the SSF protocol layer in the UE 205 to change the 3GPP access leg back to an active state and changes the WLAN access leg to a standby state. Afterwards, the UE 205 and the ATSSS function 215 forward all data flow traffic over the 3GPP access (see transactions 940).

While FIGS. 7-9 depict the UE 205 initially utilizing the 3GPP access and the ATSSS function 215 deciding to move at least some of the UE 205's traffic to the WLAN access, initially utilizing the 3GPP access is an example only and is not to limit the disclosure. In other embodiments, the UE 205 may initially utilize the WLAN access and the ATSSS function 215 may decide to move at least some of the UE 205's traffic to the 3GPP access.

Figure 10:
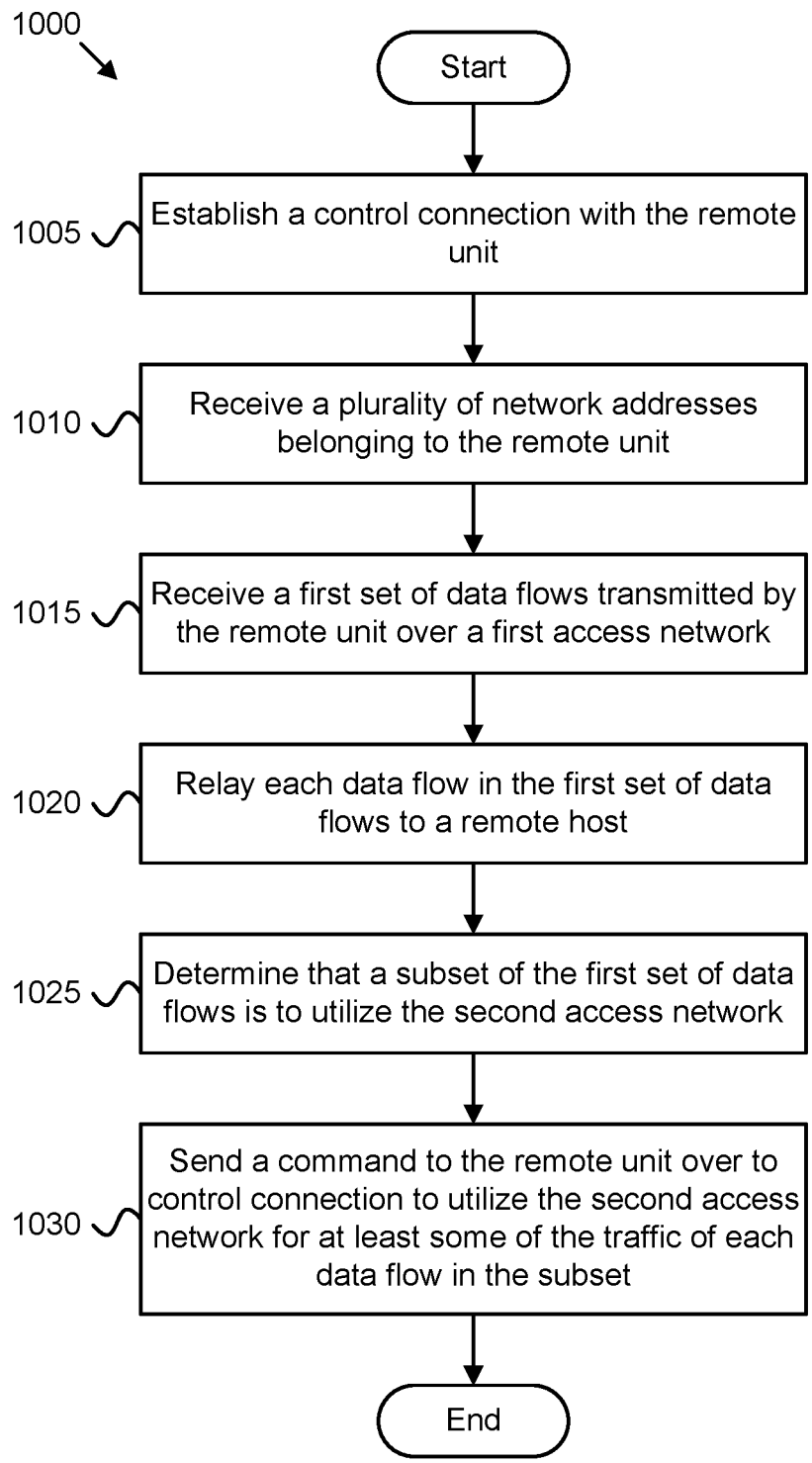
FIG. 10 is a schematic flow chart diagram illustrating one embodiment of a method for access traffic steering, switching, and splitting.

FIG. 10 depicts a method 1000 for access traffic steering, switching, and splitting, according to embodiments of the disclosure. In some embodiments, the method 1000 is performed by an apparatus, such as the traffic control function 135, ATSSS function 215 210, and/or traffic control apparatus 400. In certain embodiments, the method 1000 may be performed by a processor executing program code, for example, a microcontroller, a microprocessor, a CPU, a GPU, an auxiliary processing unit, a FPGA, or the like.

The method 1000 begins and establishes 1005 a control connection with a remote unit. In one embodiment, a traffic control function within a mobile communication network establishes 1005 the control connection with the remote unit. In certain embodiments, establishing 1005 the control connection includes performing mutual authentication with the remote unit, wherein the control connection utilizes a TCP connection.

In some embodiments, establishing 1005 the control connection includes traffic control function providing access steering rules to the remote unit (e.g., over the control connection). Here, the access steering rules indicate on which access network the remote unit is to establish a new data flow. In certain embodiments, the traffic control function requests the access steering rules from a policy control function and forwards the access steering rules to the remote unit from the policy control function.

The method 1000 includes receiving 1010, over the control connection, a plurality of network addresses belonging to the remote unit. Here, each of the plurality of network addresses is used by the remote unit to communicate over a different access network, such as a first access network and a second access network. In certain embodiments, the first access network is a 3GPP access network, such as a radio access network of a mobile communication network, and the second access network is a non-3GPP access network, such as a wireless local area network. In some embodiments, receiving 1010 the plurality of network addresses includes receiving a network address update from the remote unit over the control connection. Here, the network address update may be in response to the remote unit connecting to and/or disconnecting from an access network.

The method 1000 includes receiving 1015 a first set of data flows transmitted by the remote unit over a first access network, wherein the first set of data flows is not received over the control connection. In one embodiment, the traffic control function receives 1015 the first set of data flows. The method 1000 includes relaying 1020 each data flow in the first set of data flows to a remote host. In one embodiment, the traffic control function relays 1020 the data flows.

The method 1000 includes determining 1025 that a subset of the first set of data flows is to utilize both the first access network and the second access network. In one embodiment, the traffic control function determines 1025 that the subset is to utilize both the first access network and the second access network. In some embodiments, determining 1025 that the subset of the first set of data flows is to utilize both the first access network and the second access network comprises selecting all or a portion of the first set of data flows based on preconfigured access selection rules.

In certain embodiments, determining 1025 that the subset of the first set of data flows is to utilize both the first access network and the second access network includes determining to split each data flow of the subset of the first set of data flows across the first access network and the second access network. In certain embodiments, determining 1025 that the subset of the first set of data flows is to utilize both the first access network and the second access network includes determining to switch the subset of the first set of data flows from the first access network to the second access network.

The method 1000 includes sending 1030 a command to the remote unit over the control connection to utilize the second access network for at least some of the traffic of each data flow in the subset of the first set of data flows. In one embodiment, the traffic control function sends 1030 the command. In some embodiments, sending 1030 the command to the remote unit over the control connection to utilize the second access network for at least some of the traffic of each data flow in the subset comprises signaling the remote unit to establish a data connection over the second access network.

In certain embodiments, the command identifies each data flow in the subset. In such embodiments, sending 1030 the command to utilize the second access network includes signaling the remote unit to activate a previously established data connection over the second access network. In certain embodiments, the command includes a target address belonging to the apparatus. In such embodiments, sending 1030 the command to utilize the second access network includes signaling the remote unit to send at least some traffic of each data flow in the subset to the target address over the second access network.

Where it was determined that the remote unit transfer a first portion of the traffic of each data flow in the subset over the first access network and a second portion of the traffic of each data flow in the subset over the second access network, then sending 1030 the command to utilize the second access network includes signaling the remote unit to transfer a first portion of the traffic of each data flow in the subset over the first access network and a second portion of the traffic of each data flow in the subset over the second access network. Where it was determined that the remote unit switch the subset of the first set of data flows from the first access network to the second access network, sending 1030 the command to utilize the second access network includes signaling the remote unit to transfer all traffic of each data flow in the subset from the first access network to the second access network.

In some embodiments, sending 1030 the command includes receiving a second set of data flows transmitted by the remote unit over the second access network in response to the command. Here, the second set of flows corresponds to the subset of the first data flows. In such embodiments, relaying 1020 each data flow in the first set of data flows to a remote host comprises relaying each data flow in the second set of data flows to a corresponding remote host. The method 1000 ends.

Figure 11:
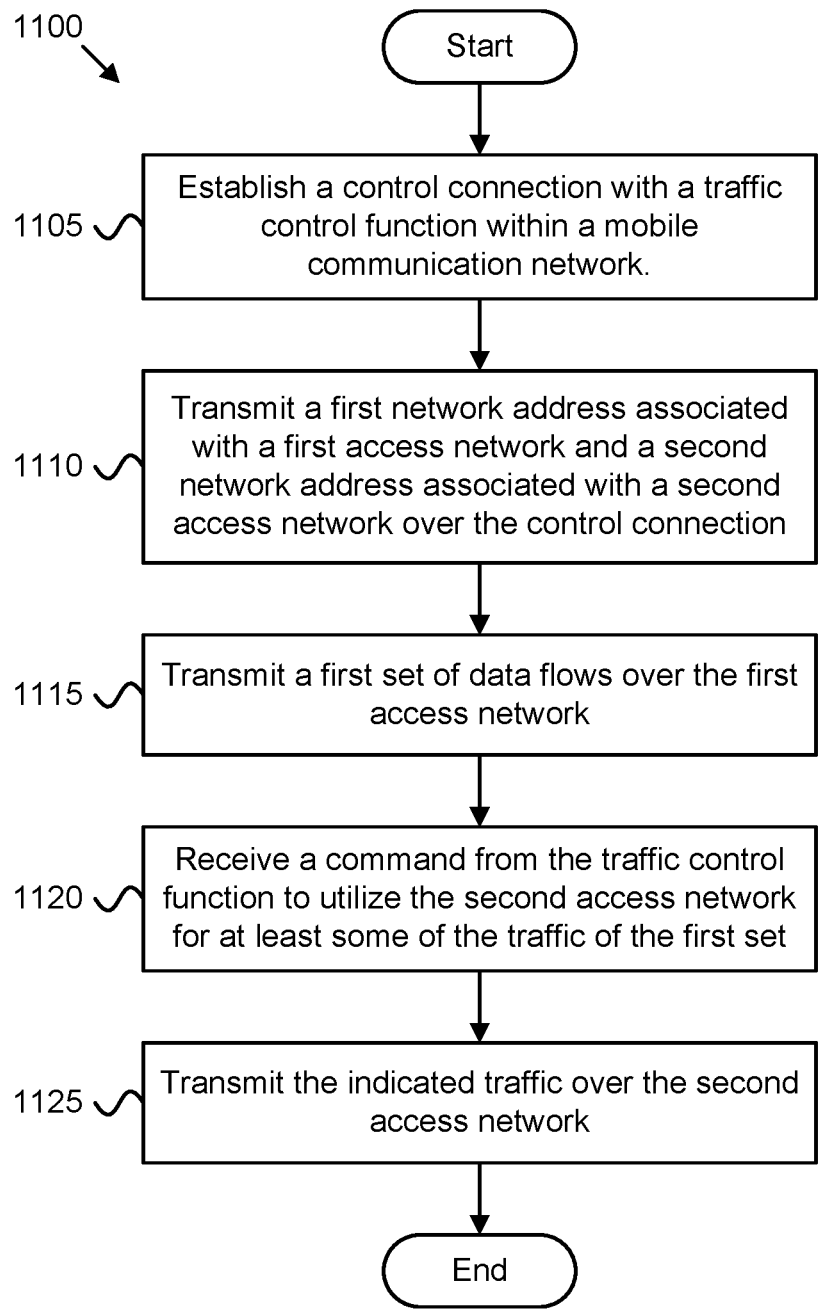
FIG. 11 is a schematic flow chart diagram illustrating another embodiment of a method for access traffic steering, switching, and splitting.

FIG. 11 depicts a method 1100 for access traffic steering, switching, and splitting, according to embodiments of the disclosure. In some embodiments, the method 1100 is performed by an apparatus, such as the remote unit 105, UE 205, or remote apparatus 300. In certain embodiments, the method 1100 may be performed by a processor executing program code, for example, a microcontroller, a microprocessor, a CPU, a GPU, an auxiliary processing unit, a FPGA, or the like.

The method 1100 begins and establishes 1105 a control connection with a traffic control function within a mobile communication network. In one embodiment, the traffic control function is an ATSSS function 215 210. In other embodiments, the traffic control function may be a MME, an AMF, or other network function of the mobile core network 130. In certain embodiments, establishing 1105 the control connection comprises the remote unit performing mutual authentication with the traffic control function, wherein the control connection is a TCP connection. In some embodiments, establishing 1105 the control connection includes receiving, by the remote unit, access steering rules over the control connection, wherein the access steering rules are used by the remote unit to determine an access network on which to establish a new data flow.

The method 1100 includes transmitting 1110 a first network address of the remote unit associated with a first access network and a second network address of the remote unit associated with a second access network. Here, the network addresses are sent over the control connection. Note that the remote unit communicates with the mobile communication network over the first and second access networks. In one embodiment, the first access network is a radio access network of a mobile communication network and the second access network is a wireless local area network. In certain embodiments, transmitting 1110 the first and second network addresses includes transmitting, over the control connection, a network address update, for example, in response to the remote unit connecting to an access network and/or disconnecting from an access network.

The method 1100 includes the remote unit transmitting 1115 a first set of data flows over the first access network. Here, the first set of data flows is not transmitted over the control connection. In certain embodiments, transmitting 1115 the first set of data flows over the first access network includes the remote unit establishing a first TCP connection via UP functions of the mobile communication network. Here, the UP functions route traffic to the traffic control function based on preconfigured routing rules.

The method 1100 includes the remote unit receiving 1120 a command from the traffic control function to utilize the second access network for at least some of the traffic of each data flow in a subset of the first set of data flows. In some embodiments, the command identifies each data flow in the subset. In one embodiment, receiving 1120 the command to utilize the second access network includes the remote unit receiving instructions to establish an access leg of a multipath connection over the second access network. In another embodiment, receiving 1120 the command to utilize the second access network includes the remote unit receiving instructions to activate a previously established access leg of a multipath connection over the second access network.

In one embodiment, receiving 1120 the command to utilize the second access network includes receiving instructions to transfer a first portion of the traffic of each data flow in the subset over the first access network and a second portion of the traffic of each data flow in the subset over the second access network. In another embodiment, receiving the command to utilize the second access network includes the remote unit receiving instructions to transfer all traffic of each data flow in the subset from the first access network to the second access network.

The method 1100 includes the remote unit transmitting 1125 the at least some traffic of the subset over the second access network. In some embodiments, transmitting 1125 at least some traffic of the subset over the second access network comprises the remote unit establishing a second TCP data connection over the second access network without closing the first TCP data connection. In certain embodiments, the command includes a target address belonging to the traffic control function. Here, transmitting 1125 the at least some traffic of the subset over the second access network includes the remote unit sending at least some traffic of the data flows in the subset to the target address over the second access network.

Where the received command instructs the remote unit to transfer a first portion of the traffic of each data flow in the subset over the first access network and a second portion of the traffic of each data flow in the subset over the second access network, transmitting 1125 the at least some traffic of the subset over the second access network includes the remote unit transmitting the first portion over the first TCP data connection and the second portion over the second TCP data connection. Where the received command instructs the remote unit to transfer all traffic of each data flow in the subset from the first access network to the second access network, transmitting 1125 the at least some traffic of the subset over the second access network includes the remote unit transmitting all traffic of each data flow of the subset over the second TCP data connection while maintaining the first TCP data connection. The method 1100 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a network interface that communicates with a remote unit;
   a processor that:
   establishes a control connection with the remote unit;
   receives, over the control connection, a plurality of network addresses belonging to the remote unit, each of the plurality of network addresses used by the remote unit to communicate over a different access network;
   receives a first set of data flows transmitted over a first access network, wherein the first set of data flows is not received over the control connection;
   associates the first set of data flows with the remote unit based on a source address of the first set of data flows and the network addresses belonging to the remote unit;
   relays each data flow in the first set of data flows to a remote host;
   determines that a subset of the first set of data flows is to utilize both the first access network and the second access network; and
   sends a command to the remote unit over the control connection to utilize the second access network for at least some traffic of each data flow in the subset of the first set of data flows.

2. The apparatus of claim 1, wherein the processor provides access steering rules to the remote unit over the control connection, wherein the access steering rules indicate on which access network the remote unit is to establish a new data flow.

3. The apparatus of claim 1,
   wherein determining that a subset of the first set of data flows is to utilize both the first access network and the second access network comprises the processor determining to split each data flow of the subset of the first set of data flows across the first access network and the second access network,
   wherein sending the command to the remote unit over the control connection to utilize the second access network for at least some of the traffic of each data flow in the subset of the first set of data flows comprises the processor signaling the remote unit to transfer a first portion of the traffic of each data flow in the subset over the first access network and a second portion of the traffic of each data flow in the subset over the second access network.

4. The apparatus of claim 1,
wherein determining that a subset of the first set of data flows is to utilize both the first access network and the second access network comprises the processor determining to switch the subset of the first set of data flows from the first access network to the second access network,
wherein sending the command to the remote unit over the control connection to utilize the second access network for at least some of the traffic of each data flow in the subset of the first set of data flows comprises the processor signaling the remote unit to transfer all traffic of each data flow in the subset from the first access network to the second access network.

5. The apparatus of claim 1, wherein sending the command to the remote unit over the control connection to utilize the second access network for at least some of the traffic of each data flow in the subset comprises the processor signaling the remote unit to establish a data connection over the second access network.

6. The apparatus of claim 1, wherein the command identifies each data flow in the subset, wherein sending the command to the remote unit over the control connection to utilize the second access network for at least some of the traffic of each data flow in the subset comprises the processor signaling the remote unit to activate a previously established data connection over the second access network.

7. A method comprising:
establishing, by a network function within a mobile communication network, a control connection with a remote unit;
receiving, over the control connection, a plurality of network addresses belonging to the remote unit, each of the plurality of network addresses used by the remote unit to communicate over a different access network;
receiving, at the network function, a first set of data flows transmitted over a first access network, wherein the first set of data flows is not received over the control connection;
associating, by the network function, the first set of data flows with the remote unit based on a source address of the first set of data flows and the network addresses belonging to the remote unit;
relaying, by the network function, each data flow in the first set of data flows to a remote host;
determining, at the network function, that a subset of the first set of data flows is to utilize both the first access network and a second access network; and
sending, by the network function, a command to the remote unit over the control connection to utilize the second access network for at least some traffic of each data flow in the subset of the first set of data flows.

8. The method of claim 7,
wherein determining that a subset of the first set of data flows is to utilize both the first access network and the second access network comprises determining to split each data flow of the subset of the first set of data flows across the first access network and the second access network,
wherein sending the command to the remote unit over the control connection to utilize the second access network for at least some of the traffic of each data flow in the subset of the first set of data flows comprises signaling the remote unit to transfer a first portion of the traffic of each data flow in the subset over the first access network and a second portion of the traffic of each data flow in the subset over the second access network.

9. The method of claim 7,
wherein determining that a subset of the first set of data flows is to utilize both the first access network and the second access network comprises determining to switch the subset of the first set of data flows from the first access network to the second access network,
wherein sending the command to the remote unit over the control connection to utilize the second access network for at least some of the traffic of each data flow in the subset of the first set of data flows comprises signaling the remote unit to transfer all traffic of each data flow in the subset from the first access network to the second access network.

10. The method of claim 7, wherein receiving the first set of data flows transmitted by the remote unit over the first access network comprises:
receiving a plurality of data flows;
observing a source address of the plurality of data flows; and
identifying as the first set of data flows those data flows whose source address matches a network address used by the remote unit to communicate over with the first access network.

11. An apparatus comprising:
a first transceiver that communicates with a mobile communication network over a first access network;
a second transceiver that communicates with the mobile communication network over a second access network; and
a processor that:
establishes a control connection with a network function within the mobile communication network;
transmits, over the control connection, a first network address of the apparatus associated with the first access network and a second network address of the apparatus associated with the second access network;
transmits a first set of data flows to the network function over the first access network, wherein the first set of data flows is not transmitted over the control connection, wherein the first set of data flows are associated with the apparatus based on a source address of the first set of data flows and the network addresses belonging to the remote unit;
receives a command from the network function over the control connection to utilize the second access network for at least some traffic of each data flow in a subset of the first set of data flows; and
transmits at least some of the traffic of the subset to the network function over the second access network.

12. The apparatus of claim 11, wherein transmitting the first set of data flows over the first access network comprises the processor establishing a first transmission control protocol ("TCP") data connection over the first access network, and wherein transmitting at least some traffic of the subset over the second access network comprises the processor establishing a second TCP data connection over the second access network without closing the first TCP data connection.

13. The apparatus of claim 12,
wherein receiving the command over the control connection to utilize the second access network for at least some of the traffic of each data flow in the subset of the first set of data flows comprises the processor receiving instructions to transfer a first portion of the traffic of each data flow in the subset over the first access network and a second portion of the traffic of each data flow in the subset over the second access network, wherein transmitting at least some traffic of the subset over the second access network comprises the processor transmitting the first portion over the first TCP data connection and the second portion over the second TCP data connection.

14. The apparatus of claim 12, wherein receiving the command over the control connection to utilize the second access network for at least some of the traffic of each data flow in the subset of the first set of data flows comprises the processor receiving instructions to transfer all traffic of each data flow in the subset from the first access network to the second access network, wherein transmitting at least some traffic of the subset over the second access network comprises the processor transmitting all traffic of each data flow of the subset over the second TCP data connection while maintaining the first TCP data connection.

15. The apparatus of claim 11, wherein the command identifies each data flow in the subset, wherein receiving the command over the control connection to utilize the second access network for at least some of the traffic of each data flow in the subset of the first set of data flows comprises the processor receiving instructions to establish an access leg of a multipath connection over the second access network.

16. The apparatus of claim 11, wherein the command identifies each data flow in the subset, wherein receiving the command over the control connection to utilize the second access network for at least some of the traffic of each data flow in the subset of the first set of data flows comprises the processor receiving instructions to activate a previously established access leg of a multipath connection over the second access network.

17. A method comprising:

establishing a control connection with a network function within a mobile communication network transmitting, over the control connection, a first network address of a remote unit associated with a first access network and a second network address of the remote unit associated with a second access network, wherein the remote unit communicates with the mobile communication network over the first and second access networks;

transmitting, by the remote unit, a first set of data flows to the network function over the first access network, wherein the first set of data flows is not transmitted over the control connection, wherein the first set of data flows is associated with the remote unit based on a source address of the first set of data flows and the network addresses belonging to the remote unit;

receiving, at the remote unit, a command from the network function to utilize the second access network for at least some traffic of each data flow in a subset of the first set of data flows; and transmitting, by the remote unit, at least some of the traffic of the subset to the network function over the second access network.

18. The method of claim 17, wherein transmitting the first set of data flows over the first access network comprises the remote unit establishing a first transmission control protocol ("TCP") data connection over the first access network, and wherein transmitting at least some traffic of the subset over the second access network comprises the remote unit establishing a second TCP data connection over the second access network without closing the first TCP data connection.

19. The method of claim 18, wherein receiving the command over the control connection to utilize the second access network for at least some of the traffic of each data flow in the subset of the first set of data flows comprises the remote unit receiving instructions to transfer a first portion of the traffic of each data flow in the subset over the first access network and a second portion of the traffic of each data flow in the subset over the second access network, wherein transmitting at least some traffic of the subset over the second access network comprises the remote unit transmitting the first portion over the first TCP data connection and the second portion over the second TCP data connection.

20. The method of claim 18, wherein receiving the command over the control connection to utilize the second access network for at least some of the traffic of each data flow in the subset of the first set of data flows comprises the remote unit receiving instructions to transfer all traffic of each data flow in the subset from the first access network to the second access network, wherein transmitting at least some traffic of the subset over the second access network comprises the remote unit transmitting all traffic of each data flow of the subset over the second TCP data connection while maintaining the first TCP data connection.

* * * * *